United States Patent
Wu

(10) Patent No.: US 10,430,894 B2
(45) Date of Patent: Oct. 1, 2019

(54) GAMIFICATION FOR ONLINE SOCIAL COMMUNITIES

(71) Applicant: Khoros, LLC, San Francisco, CA (US)

(72) Inventor: Michael Wu, Oakland, CA (US)

(73) Assignee: KHOROS, LLC, San Francisco, CA (US)

( * ) Notice: Subject to any disclaimer, the term of this patent is extended or adjusted under 35 U.S.C. 154(b) by 592 days.

(21) Appl. No.: 15/018,787

(22) Filed: Feb. 8, 2016

(65) Prior Publication Data

US 2016/0151704 A1 Jun. 2, 2016

Related U.S. Application Data

(63) Continuation-in-part of application No. 14/824,021, filed on Aug. 11, 2015, which is a continuation of
(Continued)

(51) Int. Cl.
*G06Q 30/02* (2012.01)
*G06Q 50/00* (2012.01)
(Continued)

(52) U.S. Cl.
CPC ............ *G06Q 50/01* (2013.01); *A63F 13/35* (2014.09); *A63F 13/46* (2014.09); *G06Q 30/0231* (2013.01)

(58) Field of Classification Search
CPC .... G06Q 50/01; G06Q 30/0231; A63F 13/35; A63F 13/46
(Continued)

(56) References Cited

U.S. PATENT DOCUMENTS 6,742,032 B1 * 5/2004 Castellani .............. G06Q 30/02
   709/205
8,200,527 B1 * 6/2012 Thompson ......... G06Q 10/0639
   705/7.38
(Continued)

OTHER PUBLICATIONS

Gamification in an Online Community (Sanat Kumar Bista, Surya Nepal, Nathalie Colineau, Cecile Paris, 2012 IEE Publication).*
(Continued)

*Primary Examiner* — Victoria E Frunzi
(74) *Attorney, Agent, or Firm* — Kokka & Backus, PC

(57) ABSTRACT

A computer hosts an online community for a business entity. The community includes multiple feedback interfaces that quantify each user's engagement with the community. Each feedback interface has a distinct interaction time scale, from immediate to a year or more, with intermediate feedback interfaces. The process measures reduction in technical support costs based on the community engagement, and alerts a community manager when too many users are not completing a task for one feedback interface. The manager creates a targeted mission for the appropriate subpopulation of users. The mission specifies an action and a time limit. Completion of the action increases completion of the task. Messages are sent to users in the subpopulation to alert them of the mission. The mission feedback interface provides feedback visually for users in the subpopulation. The mission feedback includes indicators of remaining time and percent completion.

19 Claims, 24 Drawing Sheets

Related U.S. Application Data application No. 13/848,706, filed on Mar. 21, 2013, now Pat. No. 9,105,044.

(51) Int. Cl.
*A63F 13/35* (2014.01)
*A63F 13/46* (2014.01)

(58) Field of Classification Search
USPC .......................................... 705/14.31, 14.32
See application file for complete search history.

(56) References Cited

U.S. PATENT DOCUMENTS

| | | | |
|---|---|---|---|
| 9,311,683 | B1 | 4/2016 | Saylor et al. |
| 2001/0025253 | A1 | 9/2001 | Heintz et al. |
| 2001/0047290 | A1* | 11/2001 | Petras ............... G06F 17/30699 |
| | | | 707/749 |
| 2008/0109491 | A1* | 5/2008 | Gupta ............... G06F 17/30867 |
| 2008/0189406 | A1 | 8/2008 | Shen |
| 2008/0306830 | A1 | 12/2008 | Lasa et al. |
| 2009/0138472 | A1 | 5/2009 | MacLean |
| 2010/0106730 | A1* | 4/2010 | Aminian ................ G06Q 10/10 |
| | | | 707/748 |
| 2013/0116044 | A1 | 5/2013 | Schwartz |
| 2014/0082072 | A1* | 3/2014 | Kass ................. G06F 17/30867 |
| | | | 709/204 |
| 2014/0181194 | A1 | 6/2014 | Sullivan |

OTHER PUBLICATIONS

Lithium Technologies, Inc., International Search Report, PCT/US2014/031345, dated Nov. 18, 2014, 11 pgs.

Lithium Technologies, Inc., International Preliminary Report on Patentability, PCT/US2014/031345, dated Sep. 22, 2015, 9 pgs.

Wu, Office Action, U.S. Appl. No. 13/848,706, dated Nov. 25, 2014, 31 pgs.

Wu, Notice of Allowance, U.S. Appl. No. 13/848,706, dated Apr. 7, 2015, 18 pgs.

Wu, Office Action, U.S. Appl. No. 14/824,021, dated Nov. 6, 2018, 17 pgs.

* cited by examiner

Feedback Spectrum

| | Points / Involvement | Simple Badges | Leader Boards | Metabadges / Awards | Ranks / Reputation | Portable Reputation |
|---|---|---|---|---|---|---|
| Time scale of reinforcement | short (immediate) | | | | | long (years) |
| Visibility | private (on to the user) | | | public within the community | | public beyond the community |
| Behavior | single action 440 | sequence of actions | | many actions | | reciprocity actions |
| Metric Type | total accumulative | | frequency | | any previous achievement | reciprocity |
| Susceptibility to Gaming | easy to game | | | harder to game | | very difficult to game |
| Value to the User | extrinsic rewards with little or no intrinsic value | | | has social value | | has long-term intrinsic value |
| Sustainability | not sustainable | | | more sustainable | | long-term sustainable |

Figure 4

WHEN TO USE MISSIONS?

- as the players progress through the gamification ladder, the rules become more obscure and harder to achieve
  - use mission when substantial population of players are stuck (become stagnant) and don't move onto the next rung
- ex: a badge criteria may be 50 points
  - but most people are stuck at an average of 30 points
  - mission: get 10 points by the end of the week (do this mission 2x or 3x)
- ex: producer medal requires posting 25 posts, 10 images and 1 video
  - most players have posted >10 image & > 25 messages, but don't know they had to post a video to achieve this medal
  - mission: share a funny video by the end of the week
- ex: trusted member rank requires members to be registered for the community for a year, posted 100 messages, and receive 10 kudos
  - players are not getting enough kudos to earn this rank
  - mission: give 3 kudos to your favorite posts in the next 24 hrs

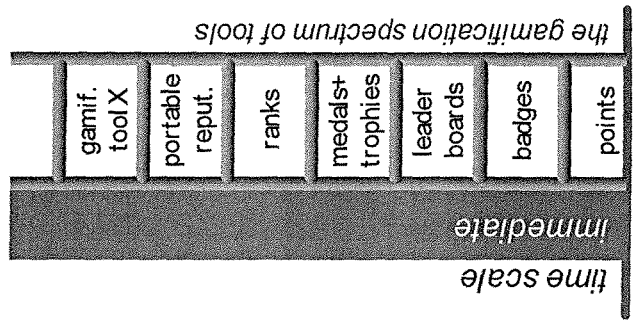

Figure 22

GAMIFICATION FOR ONLINE SOCIAL COMMUNITIES

RELATED APPLICATIONS

This application is a continuation-in-part of U.S. patent application Ser. No. 14/824,021, filed Aug. 11, 2015, entitled "Gamification for Online Social Communities," which is a continuation of U.S. patent application Ser. No. 13/848,706, filed Mar. 21, 2013, entitled "Gamification for Online Social Communities" (now U.S. Pat. No. 9,105,044), each of which is incorporated herein by reference in its entirety.

TECHNICAL FIELD

The disclosed implementations relate generally to online social communities, and more specifically to increasing user participation in those communities using techniques of gamification.

BACKGROUND

An online community is a website designed for users to interact with each other, usually with some common theme. Unlike a traditional website, in which the website owner controls all of the content, an online community enables and encourages users to participate in the content. Users post comments, replies to comments, questions, and answers to other users' questions; more experienced users develop articles and knowledge bases, and lead forum discussions or blogs.

Business entities now recognize the value of having an online community for the business. In this case, the community focus is on the products or services of the business, and users participate in the community just like any other online community. While online communities can be beneficial for marketing, online communities are not just a marketing gimmick. For example, real users post real questions, and the questions are frequently answered by other users in the community. Typically the users are customers (or prospective customers) of the business entity.

Online communities for business entities produce a positive return on investment in several ways. First, because some users are obtaining answers to their questions from the online community, it reduces the cost for technical support provided by the business entity. In addition, the online discussions and comments become part of the web, and are indexed by search engines, so a good online community is one effective tool to achieve search engine optimization (SEO).

The usefulness of an online community, however, depends on the active involvement of the users. Sometimes a user may visit the website for the online community one time, and not return. Other users may access the website only when there is an immediate pressing question. Therefore, there is a need to promote greater user participation in the online communities provided by business entities.

SUMMARY

Disclosed implementations of the present invention address the problems of user participation in online social communities by providing appropriate positive feedback using techniques of gamification. When users receive positive feedback about their involvement with the community, it encourages them to participate even more. New visitors receive enough feedback to encourage then to return to the community; intermediate users receive recognition for their assistance to others; and some users reach the level where they receive special recognition of their significant contributions to the community. Importantly, disclosed implementations utilize a continuum of feedback mechanisms, where appropriate mechanisms are highlighted in accordance with each user's proficiency and ability.

The components of some gamification systems are illustrated below in FIG. 23.

In some instances, too many visitors get stuck at a certain point in the feedback continuum. To address this situation, some implementations establish "missions," which designate a stepping stone and applies a resource constraint (typically time). In this way, missions can bridge gaps in an existing feedback continuum.

In accordance with some implementations, a computer server system hosts an online community for a business entity. The computer server system includes one or more servers, where each server includes one or more processors, memory, and one or more programs stored in the memory. The one or more programs include a plurality of feedback interfaces, a participation measurement module, a notification module, a mission creation interface, and a mission feedback interface.

Each of the feedback interfaces is configured to provide respective visual feedback in a user interface for the online community. The respective visual feedback quantifies each user's interaction with the online community according to one or more respective metrics that measure user engagement with the online community. Each of the feedback interfaces has a distinct respective interaction time scale, including a first feedback interface whose time scale is immediate, a second feedback interface whose time scale is one year or more, and one or more intermediate feedback interfaces whose time scales are intermediate between the first and second feedback interfaces. The time scales for feedback interfaces are illustrated below in FIGS. 4 and 8. Each feedback interface corresponds to a gamification tool.

The participation measurement module provides the metrics that measure engagement with the online community, measures reduction in technical support costs for the business entity in relation to engagement with the online community, and alerts a community manager when a substantial subpopulation of users are not completing a task associated with an identified one of the feedback interfaces. In this context, "substantial" can specify a minimum number (e.g., 10 or 100 users), specify a percentage of the total users of the community (e.g., 5%), specify a percentage of users who have reached a level corresponding to the identified feedback interface (e.g., 10% or 20%), or a combination of such measures.

The mission creation interface enables the community manager to create a targeted mission for the subpopulation of users. The targeted mission specifies an action for users in the subpopulation to perform and specifies a time limit. Completion of the action by users in the subpopulation increase completion of the task associated with the identified one of the feedback interfaces. See FIGS. 19-22 below. In some implementations, the action for a mission includes a resource constraint other than time.

The notification module is configured to send messages to users in the subpopulation to alert them of the targeted mission.

The mission feedback interface is configured to provide mission feedback visually in the user interface for the online community for users in the subpopulation. The mission feedback includes a dynamic indicator of how much time each user has remaining to complete the action and a dynamic indicator of what portion of the action has already been completed by the user. This is illustrated in FIG. 21 below.

In some implementations, the tracked metrics are grouped into five categories: consumption, sharing, curation, creation, and co-creation. "Consumption" includes viewing a post, (e.g., reading a message, viewing an image, or watching a video), downloading an attachment, and other similar activities. "Sharing" includes sharing existing content with other people in a user's own social network (e.g., posting a link in Facebook, tweeting contents in the community, or forwarding via email). "Curation" includes any form of social validation, such as "kudos," "likes," or designating a post as an accepted solution. "Creation" includes any content created in the community. In some implementations the created content is referred to as a "posting," and can include any combination of text, images, and videos. "Co-creation" includes any company crowdsourcing of community opinions, such as ideation submission, voting on submitted ideas, polling, or collaboration between the company and the community users (e.g., co-authoring a tribal knowledge base article). The co-creation of a TKB article includes the associated workflow all the way from the nomination of content for inclusion in TKB, to the publication of the TKB article, or rejection at any point along this workflow.

In some implementations, first feedback interface displays feedback for a metric that quantifies a number of postings to the online community by each user.

In some implementations, a feedback interface of the plurality of feedback interfaces displays feedback for a metric that measures a number of kudos received for postings by each user.

In some implementations, a feedback interface of the plurality of feedback interfaces displays feedback for a metric that measures a number of postings by each user that are nominated for inclusion in a knowledge base.

In some implementations, a feedback interface of the plurality of feedback interfaces provides feedback in the form of a leader board. In some implementations, information on the leader board is filtered so that the user interface displays information for each respective user based on a group of other users sharing a set of behavior and/or demographic characteristics with the respective user.

In some implementations, the notification module is configured to send electronic messages as electronic mail, on-screen notification display, or SMS text messages.

In some implementations, the feedback interfaces include a reputation module configured to communicate achievement badges with online social media other than the online community and verify the authenticity of those badges, thereby making a user's reputation within the online community portable to the other online social media.

According to some implementations, a computer server system provides an online community for customers, and prospective customers, of a business entity. Each of the servers has one or more processors and memory, and the memory stores one or more programs. The system includes a first level feedback module configured to provide visual feedback to each user in a user interface for the online community. The visual feedback quantifies the respective user's interaction with the online community according to one or more first level metrics. The system includes a notification module configured to send an electronic message to a respective user when the user's interaction with the online community is above a predefined threshold rate. (In some implementations, the notification module is configured to send an electronic message to a respective user when the user's interaction with the online community is below a predefined threshold rate.) The electronic message is sent over a communication channel distinct from the online community. The system includes a second level feedback module configured to calculate a plurality of second level metrics. Each second level metric quantifies other users' evaluations of postings to the online community by a first user. The second level feedback module is configured to provide visual feedback of the second level metrics to the first user in the user interface for the online community. The system includes a third level feedback module configured to award a designated achievement badge to users whose first and second level metrics exceed a predefined set of threshold values. The achievement badge is displayed in the user interface for the online community. The three feedback modules and the notification module promote a high level of user participation in the online community and thereby contribute to a low cost of technical support provided by the business entity.

In some implementations, as users receive higher level feedback, the lower level feedback mechanisms are de-emphasized or removed from the user interface entirely. For example, when a user has received badges or awards for contributions to an online community, simple feedback of "points" or a leader board are typically not needed. The user is receiving an intrinsic reward for her community contributions, and does not need an extrinsic point system "reward." In this way, the feedback mechanisms are used when needed, but withdrawn as appropriate to reduce over-reliance on unsustainable extrinsic rewards.

In some implementations, the computer server system further includes a reputation module configured to communicate achievement badges with online social media other than the online community and verify the authenticity of those badges, thereby making a user's reputation within the online community portable to the other online social media.

In accordance with some implementations, a process operates an online community for a business entity. The process is performed at one or more servers hosting the online community. Each of the one or more servers includes one or more processors, memory, and one or more programs stored in the memory, including a plurality of feedback interfaces, a participation measurement module, a notification module, a mission creation interface, and a mission feedback interface. These interfaces and modules perform functions as identified above.

In accordance with some implementations, a non-transitory computer readable storage medium stores one or more programs configured for execution by a computer server system. The one or more programs including a plurality of feedback interfaces, a participation measurement module, a notification module, a mission creation interface, and a mission feedback interface. These interfaces and modules perform functions as identified above.

Despite the fact that there are mechanics/dynamics for gamified behavior, and thousands of gamification tools, there is one function that is common among these seemingly unrelated tools: feedback. All gamification tools give some kind of feedback to the players. The feedback can be very subtle (e.g., incrementing some metrics in the background) or very obvious (e.g., rewarding the user with a badge).

The precise mechanism of how a particular tool gives feedback to the users varies widely. It can be tactile (e.g., a vibration on a mobile device), auditory (e.g., a transient sound or music), visual (e.g., a pop-up notification), or other sensory modalities. Regardless of the mechanism, the feedback is there to tell the user something about his past actions or behaviors (e.g., progress and performance).

BRIEF DESCRIPTION OF THE DRAWINGS

FIG. 4 provides a feedback spectrum, illustrating the various characteristics of feedback techniques in accordance with some implementations.

FIGS. 19-22 illustrate using missions to fill in gaps in the feedback spectrum, in accordance with some implementations.

Like reference numerals refer to corresponding parts throughout the drawings.

DESCRIPTION OF IMPLEMENTATIONS

Figure 1:
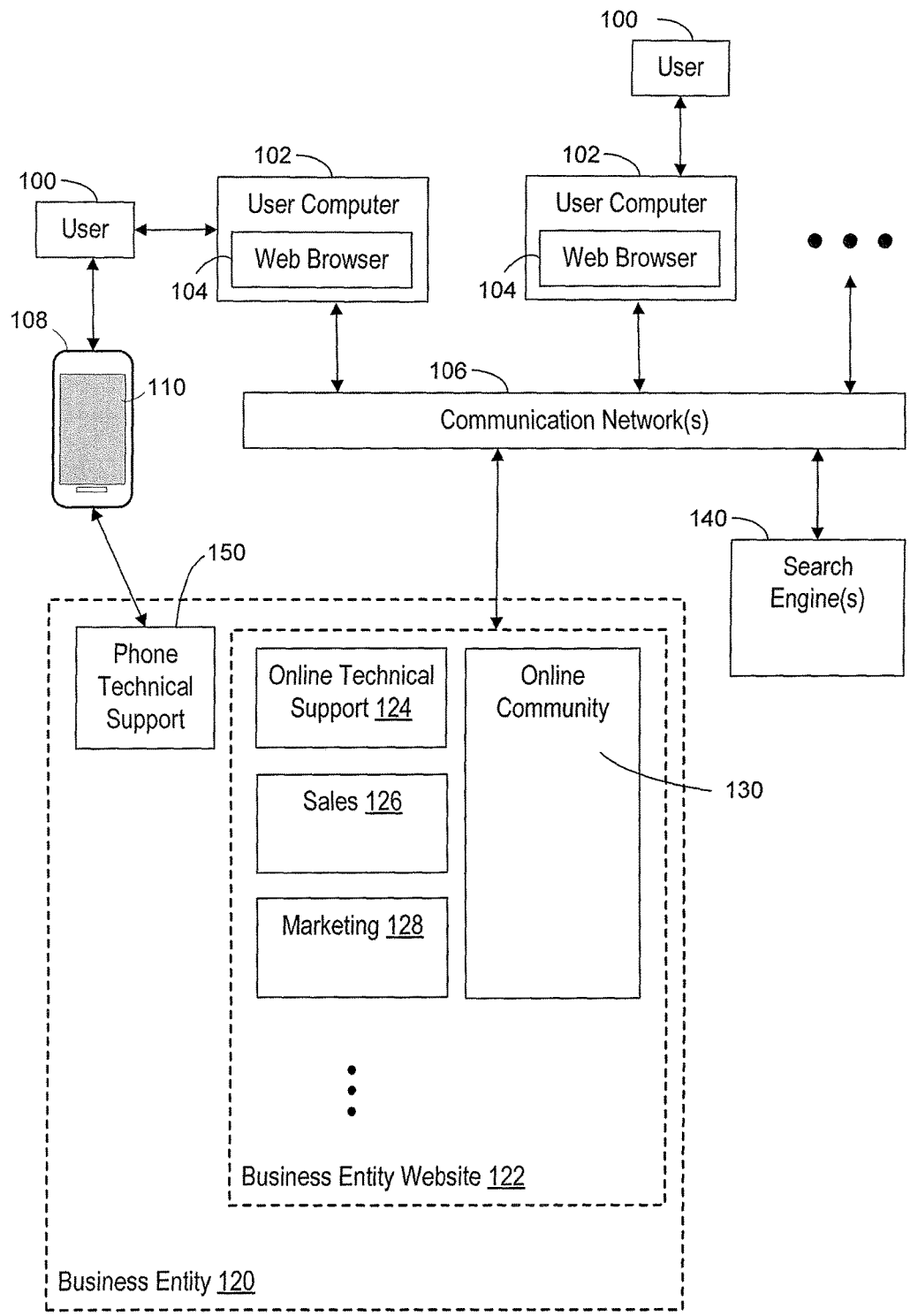
FIG. 1 illustrates the context in which some implementations of the present invention operate.

FIG. 1 illustrates the context in which implementations of the present invention operate. A business entity 120 provides products or services. To support the business, the business entity 120 maintains a website 122, operated by one or more website servers 300. The business website 122 typically includes marketing web pages 128 as well as a sales interface 126 to enable users 100 to purchase the products or services provided by the business entity 120. In some implementations, the website 122 includes access to online technical support 124, which may provide immediate support (e.g., online chat with a technical support specialist), access to an automated process flow for answering questions, access to a knowledge base, or a forum to post questions. In some implementations, the online technical support 124 is integrated with the online community 130. Many business entities also provide phone technical support 150, where users or customers speak directly to a technical support person.

As described in more detail below, some business websites 122 include an online community 130, which is a joint collaboration between the business entity 120 and the users 100. An online community typically includes topic forums where users post and ask questions, a knowledge base providing detailed solutions to various problems or issues, discussion boards on topics related to the products or services of the business 120, articles provided by individual users recognized as experts in the community, recommendations from users (e.g., recommendations for products to use as well as products to not use for specific circumstances), and so on. An online community can be an effective way to get answers to immediate questions (e.g., "what skin care product should I use to resolve a specific condition?") as well as discuss topics of general interest related to the business (e.g., "I like the high-end laptop computers provided by the company because . . . ").

Although the online community 130 is depicted in FIG. 1 as part of a single web site 122, one of skill in the art recognizes that the web site 122 may be implemented by a plurality of distinct website servers 300, and different portions of the website 122 may be hosted at different physical locations. For example, a business entity may manage the main content of its website (e.g., sales 126 and marketing 128), but may outsource the online community 130 to a third party provider.

Users 100 access the business website 122 using various computers or computing devices 102. A computing device 102 can be a desktop computer, laptop computer, tablet computer, PDA, Smartphone, or any other electronic device that includes a web browser 104 and a communication interface 204 to connect to other computers over a communication network 106, such as the Internet.

One way to find resources on the Internet or other communication network is to use a search engine 140. A search engine 140 continuously (or at least frequently) crawls the web to indentify and index the available information. In particular, search engines identify the information on the business website 122, including the information associated with the online community 130. For example, if a user 100 posts a question on a forum in the online community 130, and another user posts an answer to the question, the search engine indexes those postings, which makes it easier for other users 100 to find that information. For example, when a user 100 is searching for an answer to a question (e.g., "what type of wood should I use to build a small deck in my back yard?"), the search engine may identify a discussion about that topic on a community forum, and provide the user with a link to that forum.

As illustrated in FIG. 1, a user 100 can connect to phone technical support 150 using a telephone 108. Some users 100 have telephones 108 that are Smartphones with a user interface 110, although desktop phones and other hard wired telephones 108 would work as well. Although telephone 108 and user computer 102 are illustrated as two separate devices in FIG. 1, it is well known that the phone functionality and computing functionality may be combined in a single electronic device (e.g., Smartphone).

Figure 2:
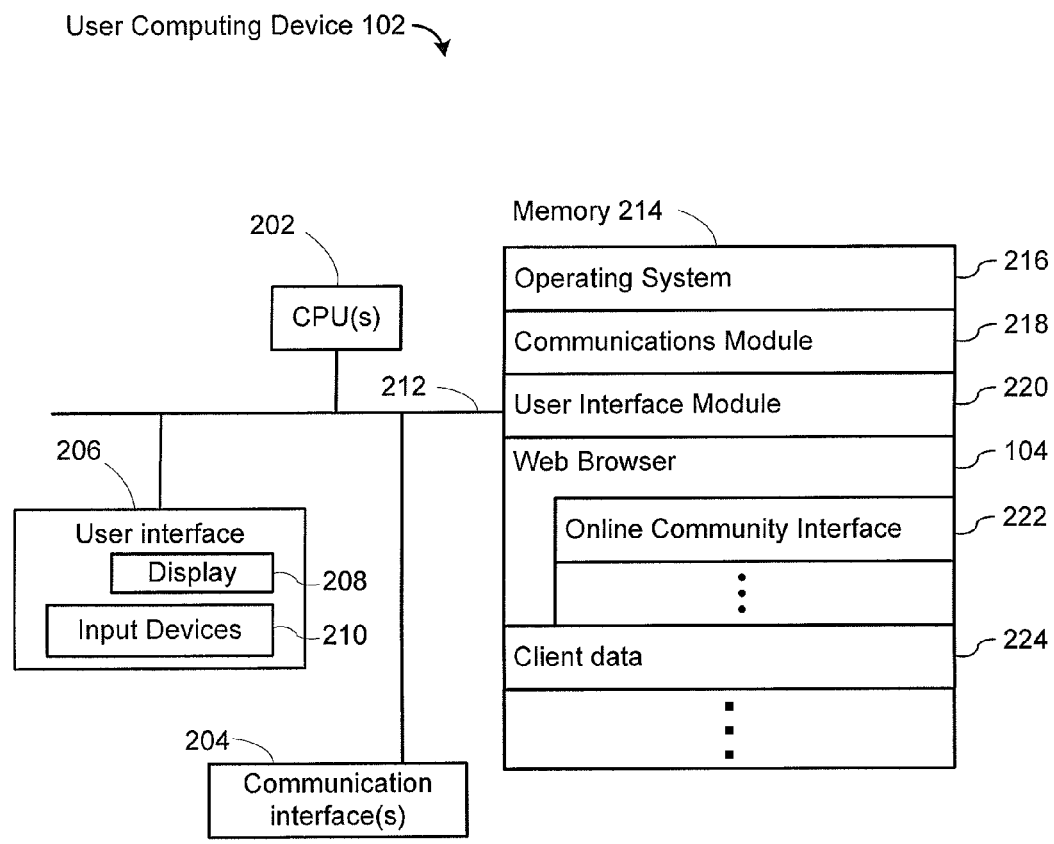
FIG. 2 is a block diagram illustrating an analytic server in accordance with some implementations.

FIG. 2 is a block diagram illustrating a user device 102, according to some implementations. The user computing device 102 can be a desktop computer, laptop computer, a Smart Phone, or other mobile device that can connect to other computing devices over a communication network 106. The user device 102 typically includes one or more processing units (CPU's) 202, one or more network or other communications interfaces 204, memory 214, and one or more communication buses 212 for interconnecting these components. The communication buses 212 may include circuitry (sometimes called a chipset) that interconnects and controls communications between system components. The user computing device 102 also includes a user interface 206 comprising a display device 208 and input devices 210 (e.g., keyboard, mouse, touch screen, keypads, etc.). The memory 514 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 214 may optionally include one or more storage devices remotely located from the CPU(s) 202. The memory 214, or alternately the non-volatile memory device(s) within the memory 214, comprises a computer readable storage medium. In some implementations, the memory 214 stores the following programs, modules and data structures, or a subset thereof:

- an operating system 216 that includes procedures for handling various basic system services and for performing hardware dependent tasks;
- a communication module 218 that is used for connecting the user computing device 102 to other computer systems via the one or more communication interfaces 204 (wired or wireless) and one or more communication networks 106, such as the Internet, other wide area networks, local area networks, metropolitan area networks, and so on;
- a user interface module 220 that receives commands from the user via the input devices 210 and generates user interface objects in the display device 208;
- a web browser 104 that enables a user to access to access resources, web pages, and web applications over a communication network;
- an online community interface 222, providing access to the online community 130 at the business website 122. In some implementations, online community interface 222 executes within the web browser 104; other implementations provide a community application that executes on the user device 102 outside of the web browser 104; and
- client data 224, such as cookies or other data saved locally and used by the online community interface 222.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, the memory 214 may store a subset of the modules and data structures identified above. Furthermore, the memory 214 may store additional modules and data structures not described above.

Although FIG. 2 shows a user computing device 102, FIG. 2 is intended more as a functional description of the various features which may be present in a user device than as a structural schematic of the implementations described herein. In practice, and as recognized by those of ordinary skill in the art, items shown separately could be combined and some items could be separated.

Figure 3:
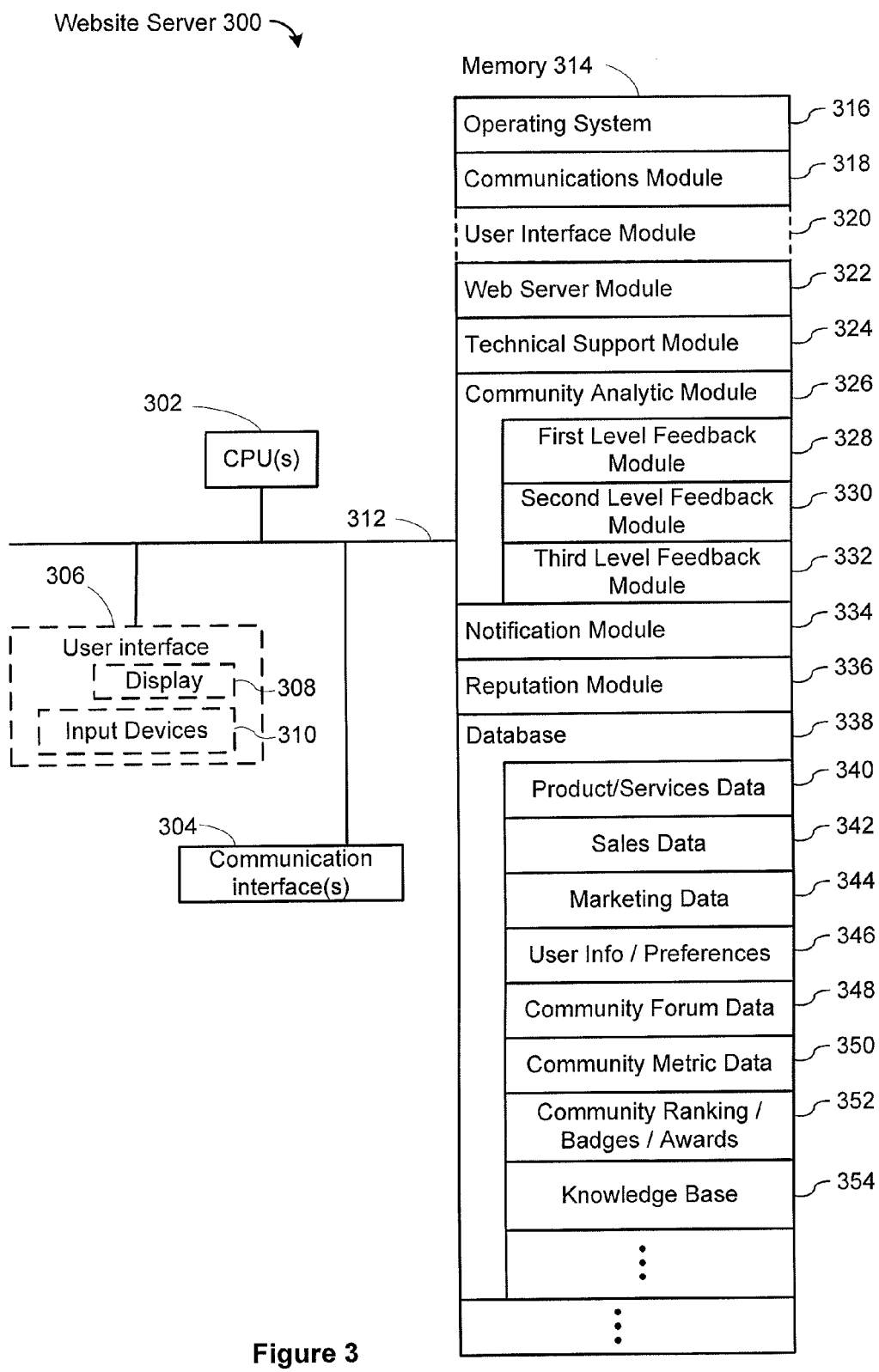
FIG. 3 is a block diagram of a user computing device in accordance with some implementations.

FIG. 3 is a block diagram illustrating a website server 300, according to some implementations. A website server 300 typically includes one or more processing units (CPU's) 302, one or more network or other communications interfaces 304, memory 314, and one or more communication buses 312 for interconnecting these components. The communication buses 312 may include circuitry (sometimes called a chipset) that interconnects and controls communications between system components. The website server 300 optionally includes a user interface 306 comprising a display device 308 and input devices 310 (e.g., keyboard, mouse, touch screen, keypads, etc.). The memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 314 optionally includes one or more storage devices remotely located from the CPU(s) 302. The memory 314, or alternately the non-volatile memory device(s) within the memory 314, comprises a computer readable storage medium. In some implementations, the memory 314 stores the following programs, modules, and data structures, or a subset thereof:

- an operating system 316, which includes procedures for handling various basic system services and for performing hardware dependent tasks;
- a communication module 318, which is used for connecting the website server 300 to other computers via the one or more communication interfaces 304 (wired or wireless) and one or more communication networks 106, such as the Internet, other wide area networks, local area networks, metropolitan area networks, and so on;
- an optional user interface module 320, which receives commands from the user via the input devices 310 and generates user interface objects in the display device 308;
- a web server module 322, which receives resource requests (e.g., HTTP requests) and returns web pages or other resources to the requestor. The web server module may run Apache Tomcat, Microsoft® Internet Information Server, or other similar software;
- an online technical support module 324, which provides a user interface for users ask questions and respond to those questions. In some implementations, the technical support module 324 is fully automated, but in other implementations, the technical support module includes support personnel, who may communicate with users through online chat, email, etc. to answer questions. The technical support module 324 provides the functionality for the online technical support 124 for the website 122;
- a community analytic module 326, which computes various metrics to quantify users' interactions with the online community 130, and to provide various feedback to encourage greater participation by users. Included in the community analytic module 326 is a first level feedback module 328, which computes metrics that quantify a user's direct involvement with the community. For example, the metrics may include number of postings, number of postings on distinct topics, number of questions asked, number of responses to other users' questions, and so on. The first level metrics are displayed for each user in the user interface so that each user has quantified feedback. In some implementations, the feedback for the first level metrics includes a ranking or comparison with other users. Generally, such feedback is provided for a relevant subset of the users. For example, a comparison of website activity for "newbies." (If would not be particularly useful or helpful to compare the activity of newbies to the activity of users who have been contributing to the community for a long time.) The community analytic module 326 also includes a second level feedback module 330, which includes a set of second level metrics that quantify a user's interactions with the community based on the evaluations of other users. For example, the second level metrics identify the number of postings by each user that have received kudos from others, the number of postings that have been designated as accepted solutions, the number of postings that have been nominated for incorporation in a knowledge base (sometimes called a "tribal knowledge base" or "TKB"), the number of knowledge base articles written by each user, and so on. The analytic module 326 provides feedback to each user about the second level metrics in the user interface for the online community 130. The community analytic module 326 also includes a third level feedback module 332, which defines certain awards based on various combinations of the first and second level metrics. For example, an award may be defined that includes all users who have been received 50 kudos for their postings, had 20 responses nominated for knowledge base articles, and have been active in the community for at least a year. Implementations generally support award definitions that are configurable and enable multiple such awards, each with its own definition. In general, multiple people can receive a specified award, as long as each user meets the criteria. Some awards specifically include a limit on the recipients, such as the first person this year to meet certain criteria, or the first N people to meet the criteria, where N is a positive integer. The awards are sometimes referred to as badges or meta-badges depending on the criteria required to receive the award. The Community analytic module 326 displays the awards in the user interface, either privately (only the user sees her own awards), publicly (everyone can see the awards), or semi-privately (only a relevant limited set of people sees each award);

a notification module 334, which notifies users 100 of specific events or conditions. In some implementations, the notification module alerts people of upcoming events that might be of interest. In some implementations, the first level feedback module 328 uses the notification module to notify a user when his involvement with the community 130 falls below a threshold rate. For example, if a user 100 has visited the community only one time in the current week (or current month, etc.), the notification module 334 may alert the user 100 of relevant items of interest, such as new knowledge base articles, new postings relevant to user's prior expressed interests, etc. The first and second level feedback modules 330 and 332 may also use the notification module to let the user 100 know that she is close to achieving a certain threshold level (e.g., 10 postings for the month).

a reputation module 336, which tracks the recognition each user has received from the community 130 (e.g., badges), and provide that recognition to other social media outside of the community. This can be particularly useful to a user 100 who has been very active in the community, and would like the earned reputation to carry over to other social media. The reputation module 336 both provides the reputation data, as well as a means to verify or authenticate the reputation. For example, a user 100 may be uniquely identified within a community by an email address, and the reputation module can verify that the user 100 with a certain email address has specific achievements within the community. Conversely, the reputation module 336 can utilize earned reputation from external social media, and incorporate it into the profile information, ranking, etc. for the user in the present online community 130.

A database 338, which stores data for the website 122. The database 338 may include relational database(s), non-relational database(s), file server(s), and/or other storage means such as cloud storage;

the database 338 stores product and services data 340 for the business entity 120. This includes descriptions of products, pricing, availability, store locations, and so on;

the database 338 stores sales data 342 for the business entity 120, including web pages that provide an online store for the products and services of the business entity 120, as well as orders for products and services placed by users 100;

the database 338 stores marketing data 344, which provides details about products and services, special sales events, and so on. In some implementations, the marketing data is combined with the product and services data 340 and/or the sales data 342;

the database 338 stores user information 346 for each user 100, including a user ID (e.g., an email address) and password, certain profile information (which may be optional), and a set of user preferences. The user preferences 346 may specify user interface features, what topics are of interest to the user, what notifications are allowed (e.g., notifications of upcoming events), and so on;

the database 338 stores community forum and discussion board data 348, including both the web pages used to implement forums and discussion boards, as well as the comments, questions, and answers provided by the users 100. The forum data 348 also includes metadata, such as the author of each posting, the time of the posting, what posting it is responding to (if any), and topic associated with the posting (supplied by the user or inferred from the posting by natural language processing or subsequent human categorization), links to subsequent responses, and so on;

the database 338 stores community metric data 350, which includes all of the metric data tracked or computed by the first, second, and third level feedback modules 328, 330, and 332. Like the community forum and discussion board data 348, the community metric data 350 includes metadata that specifies when it was computed, how it was computed (when appropriate), and so on;

the database 338 stores community ranking/badges/awards 352, both current and historical. Some items are temporal in nature (such as ranking), so some implementations store history of the rankings, making it is possible to look at what the rankings were at any point in the past. Typically, once badges are earned or awarded, they are not rescinded (unless due to error), so historical data is limited. On the other hand, awards may occur periodically (e.g., annually). For example, a "most valuable contributor" award may be given annually, so the database 338 tracks who was the most valuable contributor for each year;

the database 338 stores one or more knowledge bases 354, which contain information or articles on specific designated topics. For a small business entity 120, there is typically a single knowledge base, which can be searched by topic or keywords. For larger business entities 120, there be two or more knowledge bases 354, typically for different business units; and the database 338 also stores data, information, web pages, and configuration parameters for many other aspects of the website 122.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules and data structures not described above.

Although FIG. 3 shows a website server 300, FIG. 3 is intended more as a functional description of the various features that may be present in a set of servers than as a structural schematic of the implementations described herein. In practice, and as recognized by those of ordinary skill in the art, items shown separately could be combined and some items could be separated. For example, the database 338 and corresponding data in FIG. 4 could be implemented on a set of database servers separate from the other modules, or the web server module could be implemented on a separate set of designated web servers. The actual number of website servers 300 used and how features are allocated among them will vary from one implementation to another, and may depend in part on the amount of data traffic that the system must handle during peak usage periods as well as during average usage periods.

Each of the methods described herein may be implemented by instructions that are stored in a computer readable storage medium and that are executed by one or more processors of the website servers 300 or user computing devices 102. Each of the functional operations shown in FIGS. 2 and 3, or in the figures below may correspond to instructions stored in a computer memory or computer readable storage medium.

FIG. 4 illustrates a spectrum of feedback techniques that are applicable to keeping users engaged in an online community 130. Some feedback techniques are useful and effective to get new visitors engaged with the community (the left side of FIG. 4), and as a user 100 becomes more involved, other feedback techniques play a more important role (the right side of FIG. 4). Combining both the short term techniques and the long term techniques is an effective way to maintain a healthy, resilient community 130. As users become more involved with the community, the longer term feedback mechanisms are emphasized, and the shorter term feedback mechanisms are de-emphasized or eliminated entirely. Using this holistic approach rather than isolated feedback mechanisms provides an overall scalable architecture that is sustainable.

In some implementations, a user has some control of the feedback mechanisms as well, using user preferences 346. For example, some users may wish to turn off display of a point tally or a leader board, even before receiving any metabadges or awards. On the other hand, some users may prefer to continue receiving the simple feedback even after substantial involvement with the community.

On the left in FIG. 4 are seven characteristics for evaluating the various feedback techniques. At the top is the time scale of reinforcement 414. Some of the feedback techniques are effective for immediate feedback (e.g., does a visitor stay at the website 122 right now, or navigate to one of the millions of other websites on the Internet; does the visitor return to the website 122 during the week after the initial visit; etc.). Other feedback techniques keep long time user engaged in the community.

The second characteristic is the visibility 416 of the feedback. This ranges from visible only to an individual user 100 to being visible to everyone in the community or even beyond the community. The third characteristic in FIG. 4 is the type of behavior 418, ranging from individual actions (e.g., posting a single question to a forum) to many interrelated actions. The user actions are also measured using various metric types 420. Some simple metrics are just cumulative (e.g., number of postings my a user 100), but over time a more important metric is the frequency of postings, frequency of postings on related topics, or other more complex metrics.

The feedback techniques have some susceptibility to "gaming" 422, such as a user making bogus or duplicate postings that are counted as involvement with the website. Other feedback techniques are less susceptible to gaming, typically because the feedback metrics require the involvement of other users. For example, other users are not going to give kudos to bogus or duplicate postings. Another important characteristic of feedback metrics is the value to the user 424. The term "value" here is used in a social sense, not money. Some feedback has little intrinsic value, but the long-term feedback techniques recognize a person's valuable contributions to a community. Finally, some feedback techniques are more sustainable 426 than others. For example, just quantifying a person's postings has little value when a person posts for the 200th time. On the other hand, when a person receives public recognition for valuable contributions to a community, the recognition is frequently sufficiently value to sustain interest.

One simple feedback technique is a "point" system 402 or other metric that quantifies direct involvement by a user 100 in an online community 130. In some implementations, there is a single point system, but different numbers of points are added to a user's cumulative total based on the type of interaction. For example, posting a question or comment may be worth a single point, whereas posting an answer to another person's question might be worth 2 points. Some implementations also assign additional points when a posting receives kudos or other recognition from other users. For the time scale characteristic 414, a simple point simple has immediate, short term feedback 428. The points for involvement are typically shown only to the individual user 100, so the visibility is private 434. Typically, a point system 402 is based on single actions 440, such as making a posting, and the points accumulate 446. This sort of immediate and direct feedback helps to jump start a user's involvement in the community because the user is being "rewarded" for the behavior. Of course, receive points 402 is an extrinsic reward with little or no intrinsic value 460. Furthermore, accumulating points based on individual actions can be achieved by gaming 454 the system. For example, even nonsensical questions, comments, or alleged "answers" would count as postings and receive points. Finally, a point system by itself does not sustain 466 long term interest in the online community 130. For example, after obtaining hundreds (or thousands) of points, there is little incentive to earn more points.

Further along the feedback spectrum are simple badges 404. A simple badge is recognition for achieving a certain threshold value of points or involvement for a single metric. For example, a badge may be awarded when a user posts a message (question, answer, comment, etc.) to the online community 130 for the 20th time. Badges can also issued for achieving a certain quantity metric within a specified period of time, such as ten postings within a week. In some implementations, simple badges can be awarded in stages, such a first stage badge after 20 points, a second stage badge after 100 points, a third stage badge after 500 points, etc. The time scale 414 is slighter longer for simple badges 404, because a user 100 does not receive a badge for a single action. Like a point system, simple badges 404 are typically visible only to the individually user (434). Unlike a simple point system, where a user sees feedback for actions immediately, a badge requires a sequence of actions 472. The metric 420 for a simple badge 404 is based on total accumulative interaction, just like a point system 402. Despite requiring a greater number of user actions to receive a simple badge 404, a simple badge has many of the same drawbacks as a simple point system 402: it is still relatively easy to game 454 the system with irrelevant postings, and there is no intrinsic value (460). Simple badges 404 are slightly more sustainable 466 than a simple point system, particularly with tiered badges where each tier requires progressively more involvement with the community.

Leader boards 406 take metrics, and make the data available to groups of people within the community. on the time scale 414, a leader board 406 is in an intermediate reinforcement technique in the continuum 430. In particular, a user is now competing against others in the community, rather than just reaching a target like simple badges 404. In some implementations, a leader board is public (436) to everyone within the online community 130; in other implementations, a leader board is public (436) to a certain subset of the community 130 based on various criteria. For example, there may be a leader board for each general topic area, and the leader board for a topic area may limit visibility to those who have been involved with that topic area. In some implementations, leader boards are designated based on other demographic criteria, such as geographic location, or length of time involved with the site. For example, there could be a leader board 406 for users from the San Francisco bay area who have been involved with the online community 130 for less than 6 months. Again, such a leader board might limit its availability to users in the same designated group (e.g., users in New York City would have their own leader board). Sometimes, by limiting a leader board 406 to a relevant cohort of users, it increases each users interest and engagement with the online community 130.

In some implementations, a leader board 406 is based on frequency 448 rather than total accumulation. For example, a leader board could display the most active users for the current week. One advantage of a frequency approach is that it gives newer users an opportunity to "compete" with users who have been active for a much longer period of time. Even a user with thousands of posts will start at zero for the upcoming week (or month, etc.), and thus all users are starting at the same starting line. Some implementations provide both types of leader boards (cumulative and frequency based), and may provide them together on a single board, or have a toggle between two or more leader board views.

Leader boards 406 can still be gamed (422), if they are based on metrics that use unverified postings. However, online communities are almost always moderated (i.e., real people review postings to make sure they are meaningful, non-objectionable, etc.). If a user managed to get onto a leader board 406 through bogus or duplicate postings, it is likely that it would not last for long. Furthermore, a moderator could limit the access privileges of a user who is not using an online community 130 appropriately, thus preventing a user from repeating the gaming behavior. Although there is no guarantee that a user on a leader board 406 has contributed useful comments, questions, or answers to the community 130, public recognition can have greater intrinsic value and be more sustainable than simple badges 404. Also, based on that recognition, some users are prompted to be more active in the community, and continue to make more useful contributions.

The higher level forms of feedback identify and promote more valuable contributions from users. Metabadges 408 utilize metrics that quantify other people's evaluations of each user contributions. For example, a user's postings may receive kudos from other users, a consensus of users may designate a posting as an accepted solution, users may nominate a posting for a knowledge base article, or a user may actually contribute a knowledge base article based on users' agreement that the individual user is an expert in a certain topic area. Because metabadges 408 are based on other users' opinions, they are much harder to game 456, have more social value 462, and are more sustainable 468. Metabadges can be based on any previous achievement 450 of a user, and are based on many interactions 442. Some metabadges are based on a set of thematically related actions, which are typically relatively rare and unique. For example, for an online community 130 related to artistic work, the community might award a "critics trophy" for a user with 50 kudos plus 20 ratings plus 10 reviews plus 10 comments; an "art director medal" could be awarded to a user with 10 images that have received kudos plus 5 videos with kudos; or a "publisher medal" could be awarded to a user for being the top poster on a leader board for five consecutive weeks. Metabadges 408 are typically public 436 within the online community 130, but may be limited to a certain subset of the sets as described above with respect to leader boards 406. On the time scale 414 continuum 430, metabadges require a much longer period of time.

Ranks and reputation 410 are similar to metabadges, but are typically for a broader set of unrelated actions (442). For example, an online community could be configures to have a "valued contributor" rank for users 100 with 50 posts plus 25 kudos+10 accepted solutions; a "trusted contributor" rank for users 100 with 80 posts plus 50 kudos plus 30 accepted solutions plus registered with the community for more than a year; and a "senior producer" rank for users 100 with 50 comments plus 30 kudos plus 100 tags plus 1 publisher medal plus registered with the online community for more than 2 years. Of course each online community can configure as many ranks as appropriate and based on appropriate criteria.

Ranks typically convey certain privileges the users who achieve those ranks. For example, a senior producer may be entitled to have her own blog within the community, or have a designated forum conducted by individual. In some implementations, a rank is public only within the community, but other implementations publicize a person's rank beyond the community (438).

Some implementations provide feedback in the form of a portable reputation 412. A portable reputation basically takes rank or reputation 410 within the community 130, and exports that reputation to other communities, social media, etc. Achieving a portable reputation takes a very long time 432 (years), but it is based almost entirely on reciprocity actions 444 (i.e., making contributions to others who have recognized those contributions). Because of the reciprocity metrics, earning a portable reputation 412 is very difficult to game 458, and has long term intrinsic value 464. Moreover, a person achieves that level because of the intrinsic desire to contribute to the community 130, and thus it is long-term sustainable 470.

To make a reputation portable beyond the community (438), the reputation module 336 has an interface to export the rank/reputation to other online communities or social media. Furthermore, the reputation module 336 can verify a reputation. For example, another designated online social media site may enter into a reciprocity agreement with the online community 130. When the reputation module receives a verification request from the social media site, the module 336 can confirm the rank for the user (e.g., using the user's email address).

Figure 5A:
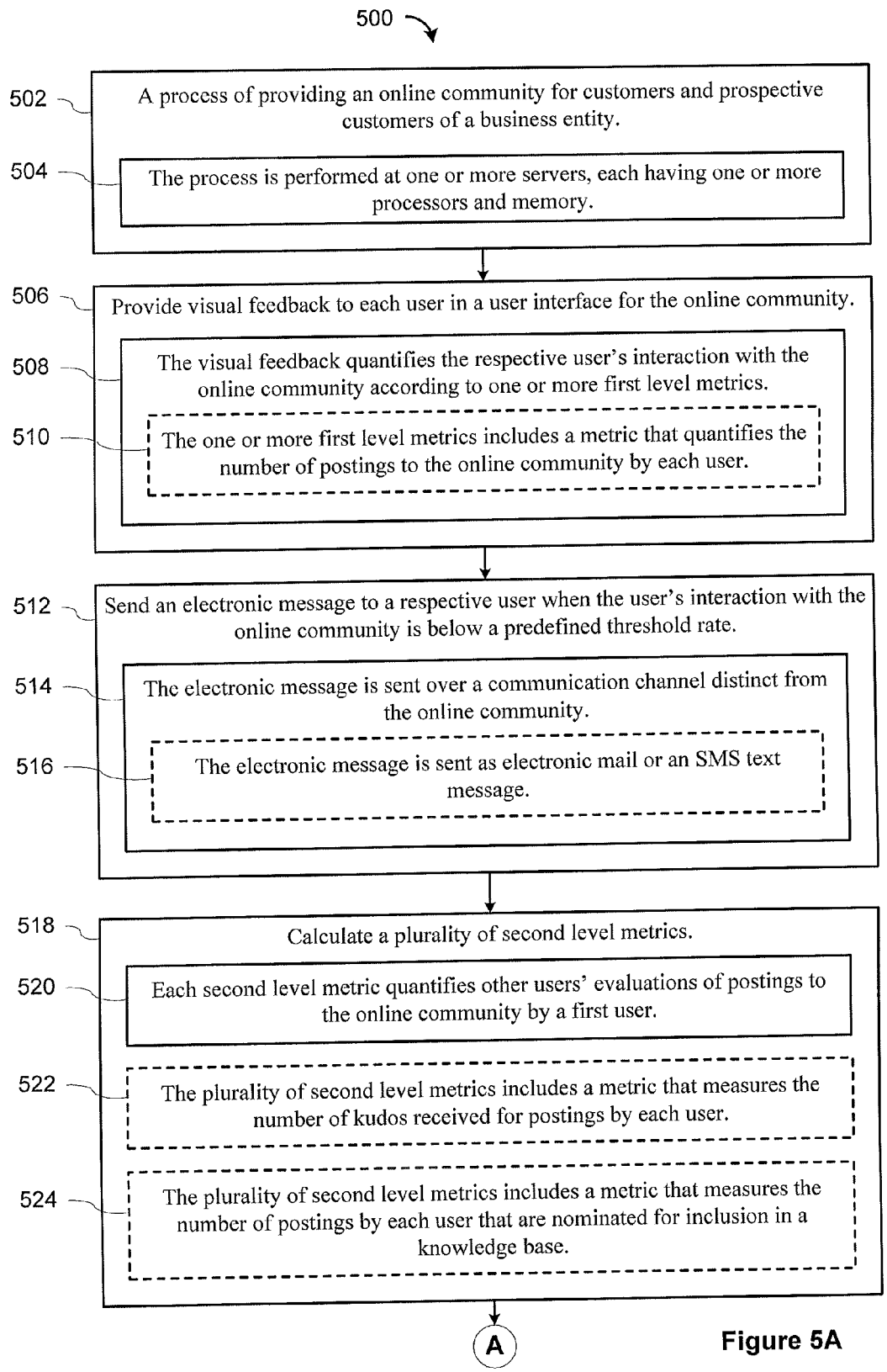
FIGS. 5A and 5B are functional block diagrams illustrating feedback processes implemented in an online community in accordance with some implementations.
Figure 5B:
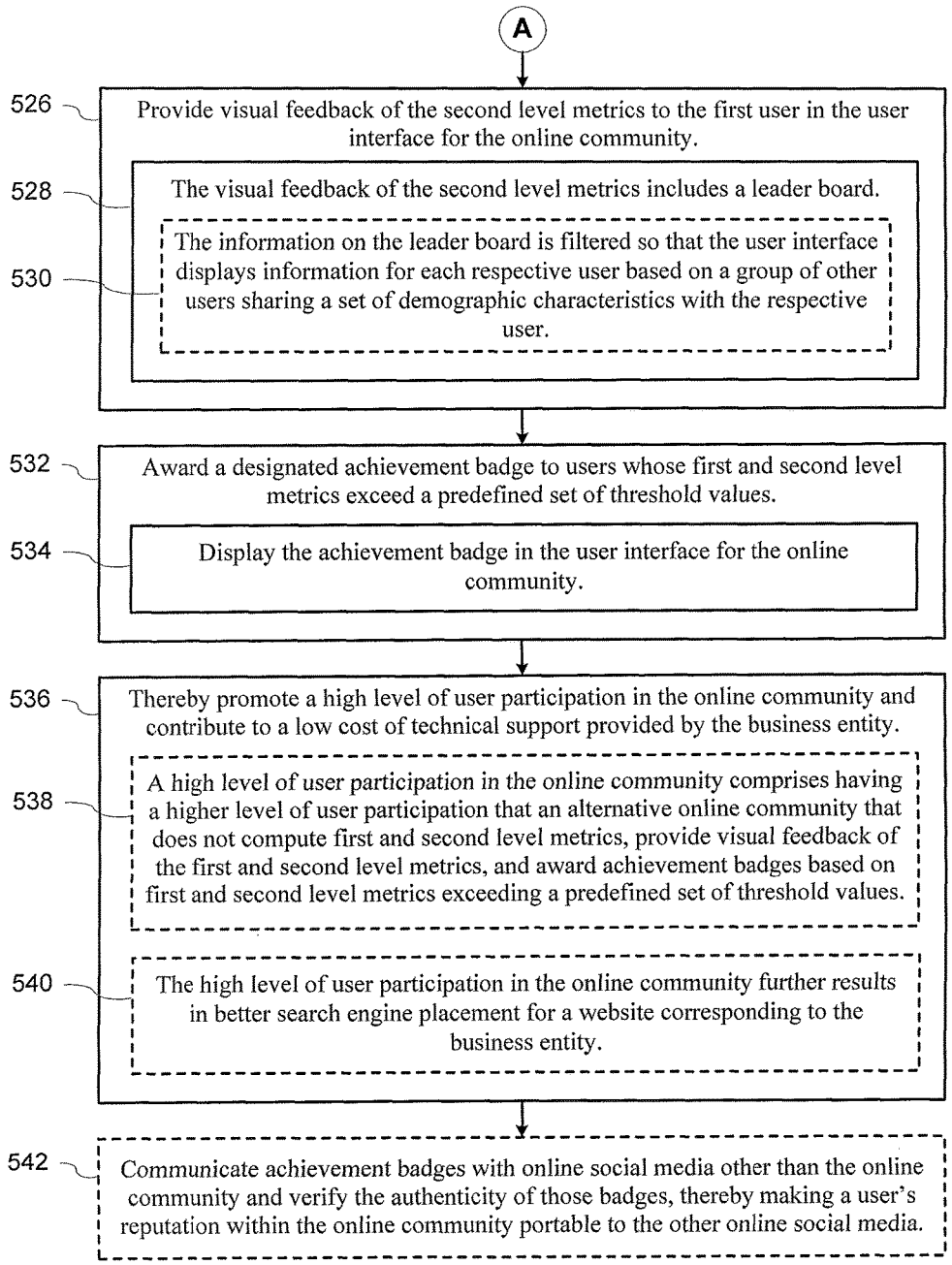

FIGS. 5A and 5B are a functional block diagram of processes 500 implemented on one or more website servers 300 hosting an online social community 130. The processes 500 provide user feedback, which results in greater user participation (both number of participants and extent of participation). Although the blocks in the diagram are listed in a specific order, they do not necessarily occur in order or in a similar time frame. For example, a first user may be receiving first level feedback, a second user receiving second level feedback, and a third user receiving third level feedback. The first user may not receive second or third level feedback for a long time (e.g., months or years), and the second user may not receive third level feedback for a long time (e.g., many months, possibly years).

The process 500 provides (502) an online community for customers and prospective customers of a business entity. In some implementations, the process 500 is also applied to non-business entities, as long as the entity has specific organizational objectives, and has an online community in which user participation helps accomplish those objectives. The process is performed (504) at one or more server computers, each having one or more processors and memory. The memory stores one or more programs that execute to perform the process 500.

The online community provides (506) visual feedback to each user, using a user interface. In some implementations, there are user preferences 346 that determine the extent of the feedback or how it is displayed (e.g., a user may turn off the feedback). The visual feedback quantifies (508) each user's interaction with the online community according to one or more first level metrics. First level metrics compute direct interaction with the community, and accumulate over time. In some implementations, the one or more first level metrics includes (510) a metric that quantifies the number of postings to the online community by each user. Some implementations further subdivide the count of postings into different types, such as questions, comments, and answers to other users' questions. In some implementations, the data for one or more first level metrics is provided in a leader board.

In some implementations, the user interface for the online community displays only first level metrics for new users of the online community. That is, second and third level metrics (described below) are not displayed for the new users. For new users, the higher level feedback mechanisms are beyond reach, and thus their display could dissuade some new users from participating. Different implementations identify new users in various ways. In some implementations, new users are users who have been registered with the online community for less than a predefined period of time (e.g., 3 months). In some implementations, new users are users whose cumulative involvement with the community is less than a first predefined involvement threshold. These implementations recognize that a user who is not very involved with the community is still a new user, even if registered with the community for a substantial period of time. In other implementations, new users are users whose involvement with the community during a preceding predefined span of time is less than a second predefined involvement threshold. Here, rather than looking at total cumulative involvement, the computer system looks only at a certain recent period of time (e.g., the past month).

A notification module 334 sends (512) an electronic message to a user when the user's interaction with then online community falls below a predefined threshold rate. For example, a new registered user may spend little or no time interacting with the community during a week. In response, the notification module can alert the user to interesting information, events, new postings, or new people available through the community. The focus of the notification is information related to the known interests of each user. For example, if a user has indicated an interest in plasma television sets, the notification module could alert the user that there is an active discussion board with new postings on that topic. Generally, the electronic messages sent by the notification module are sent (514) over a communication channel distinct from the online community. For example, some implementations support sending (516) email messages and/or SMS text messages.

A second level feedback module 330 calculates (518) several second level metrics. Each second level metric quantifies (520) other users' evaluations of postings to the online community by a first user. Unlike a first level metric, a second level metric incorporates other people's assessment of what the first user has posted, and thus a second level metric more accurately measures a person's contribution to the community. For example, in some implementations, the plurality of second level metrics includes one or more metrics that measure the number of kudos received for postings by each user. In another example, some implementations include a second level metric that measures the number of postings by each user that are nominated for inclusion in a knowledge base. The second level metrics can also be computed for specific topic categories.

The second level feedback module provides (526) visual feedback of the second level metrics to each user in the user interface for the online community. In some implementations, user preferences 346 control how the data is displayed. In some implementations, the visual feedback of the second level metrics includes (528) one or more leader boards. A leader board identifies the top contributors according to a specific metric, and in some implementations, provides data for two or more metrics. Some leader boards include both first and second level metrics. In some implementations, a leader board is configurable to display desired metrics, or to toggle between various metrics. In some implementations, the information on the leader board is filtered (530) so that the user interface displays information for each respective user based on a group of other users sharing a set of demographic characteristics with the respective user. For example, the demographic characteristics for filtering could include gender, age, geographic location, length of time as a registered user, or designated topic areas.

In some implementations, when the user interface displays one or more second level feedback metrics, the visual feedback for first level metrics is diminished. Once a user has reached a higher level of involvement, there is less need for the first level feedback, so the first level feedback can be diminished or eliminated. For example, the first level feedback could be displayed in a smaller portion of the screen, or a less conspicuous portion of the screen. In some implementations, the first level feedback is not directly displayed, but can be brought up using a user interface control (e.g., a button). In this way, the user can see the first level feedback if desired, but the first level feedback is not constantly displayed. Some implementations apply the same or similar display techniques to the interplay between second and third level metrics (e.g., not displaying third level metrics until a user has progressed to the appropriate stage and diminishing the display of second level metrics when third level metrics are displayed).

A third level feedback module 332 awards (532) a designated achievement badge to users whose first and second metrics exceed a predefined set of threshold values. The metrics selected as criteria for an achievement badge (e.g., metabadges 408) and the corresponding threshold values are configurable for each online community. Examples of metabadges 408 were described above with respect to FIG. 4. As illustrated in the examples in FIG. 4, one of the metrics is the length of time that a user has been registered with the community. Generally, achievement badges 408 are displayed (534) in the user interface for the online community, providing public recognition of a user's contribution to the community.

As a result of the three levels of feedback, more users become engaged in the community, and remain engaged in the community. That is, the feedback mechanisms promote (536) a high level of user participation in the online community. As a direct result of user participation in the online community, people who would otherwise require technical support (phone support 150 or online technical support 124) are frequently able to get answers to their questions from the online community 130. Therefore, the three levels of feedback, by increasing user participation in the community, contribute (536) to a low cost of technical support provided by the business entity.

Some implementations measure the high level of user participation by comparing an online community with and without the three levels of feedback. In particular, a high level of user participation in the online community is computed 538 in some implementations by having a higher level of user participation that an alternative online community that does not compute first and second level metrics, provide visual feedback of the first and second level metrics, and award achievement badges based on first and second level metrics exceeding a predefined set of threshold values.

In some implementations, the high level of user participation in the online community further results in (540) better search engine placement for a website corresponding to the business entity. Because data from the online community is crawled and indexed by search engines 140, search engines are more likely to correlate relevant query search terms with the online community, thus leading new users to the business website 122, and thus to the business entity 120. Furthermore, the online community typically includes lots of valuable information that new users are seeking, making it more likely that a user will do business with the business entity.

Some implementations include a reputation module 336, which enables a person who has attained various badges or ranks to carry that reputation over to other online media. For example, the reputation module 336 can communicate (542) achievement badges with online social media other than the online community and verify (542) the authenticity of those badges, thereby making a user's reputation within the online community portable to the other online social media.

Figure 6:
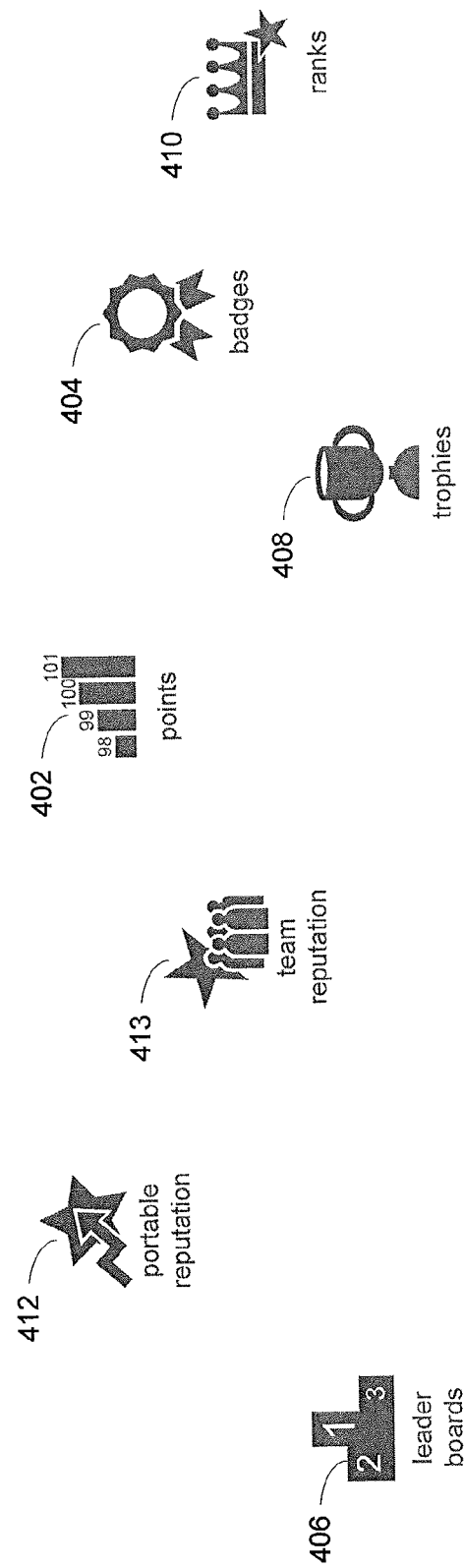
FIGS. 6 and 7 identify basic building blocks of a gamification feedback spectrum in accordance with some implementations.
Figure 7:
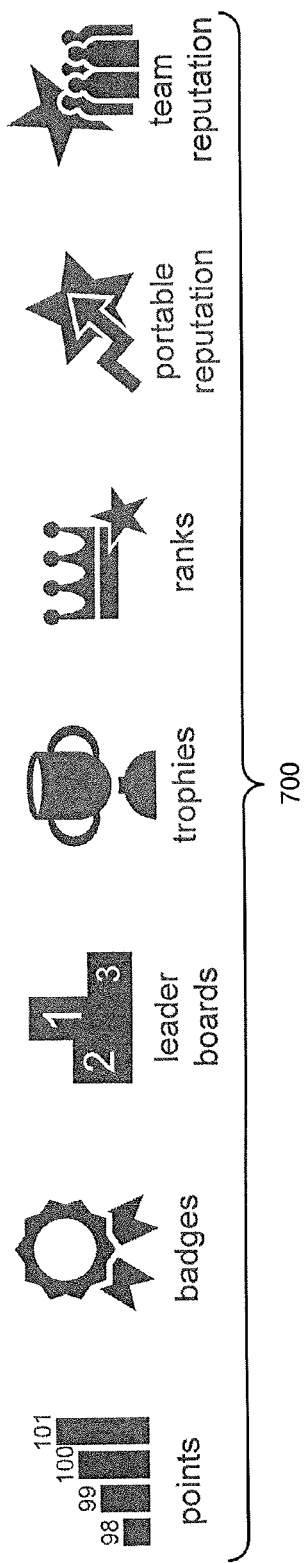
Figure 8:
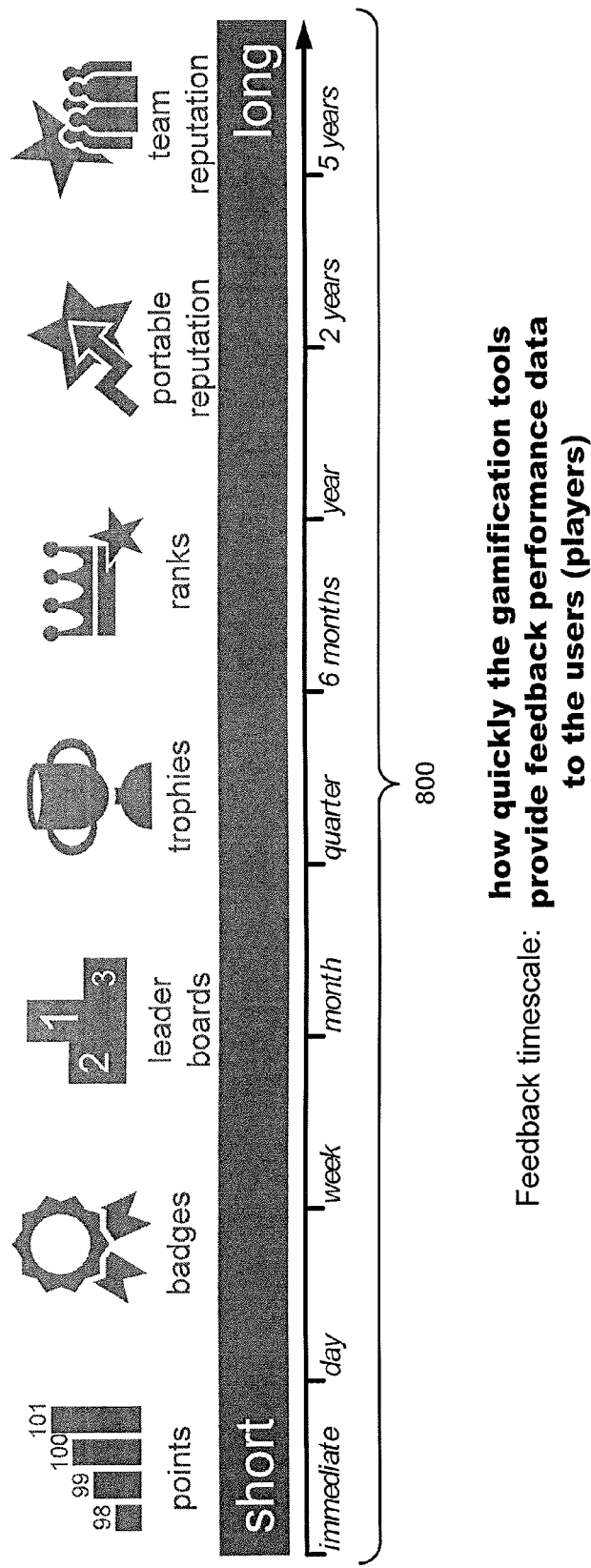
FIGS. 8-12 illustrate a feedback timescale for the tools in the gamification spectrum, and how the timescale changes based on the gamified behavior and the ability of the user, in accordance with some implementations.

FIG. 6 illustrates some of the gamification tools, as illustrated above in FIG. 4. Some implementations also include team reputation 413. In some instances, two or more people learn to work together to provide even more interaction with a community FIGS. 7 and 8 organize the gamification tools in a sequence 700 with a timescale 800, as illustrated above in FIG. 4. Note that the time-scale is non-linear. It is roughly logarithmic. The feedback timescale indicates how quickly the gamification tools provide feedback performance data to the users.

Figure 9:
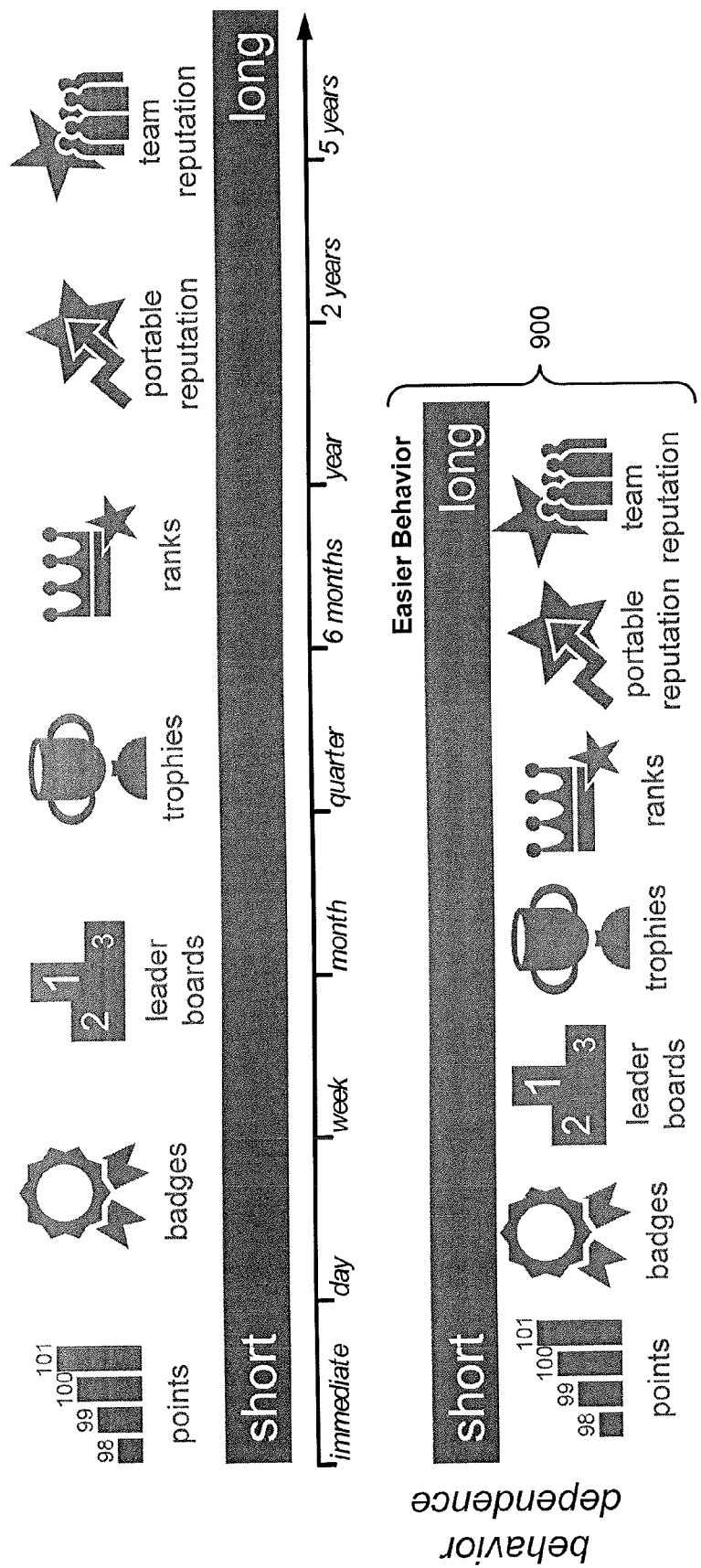
Figure 10:
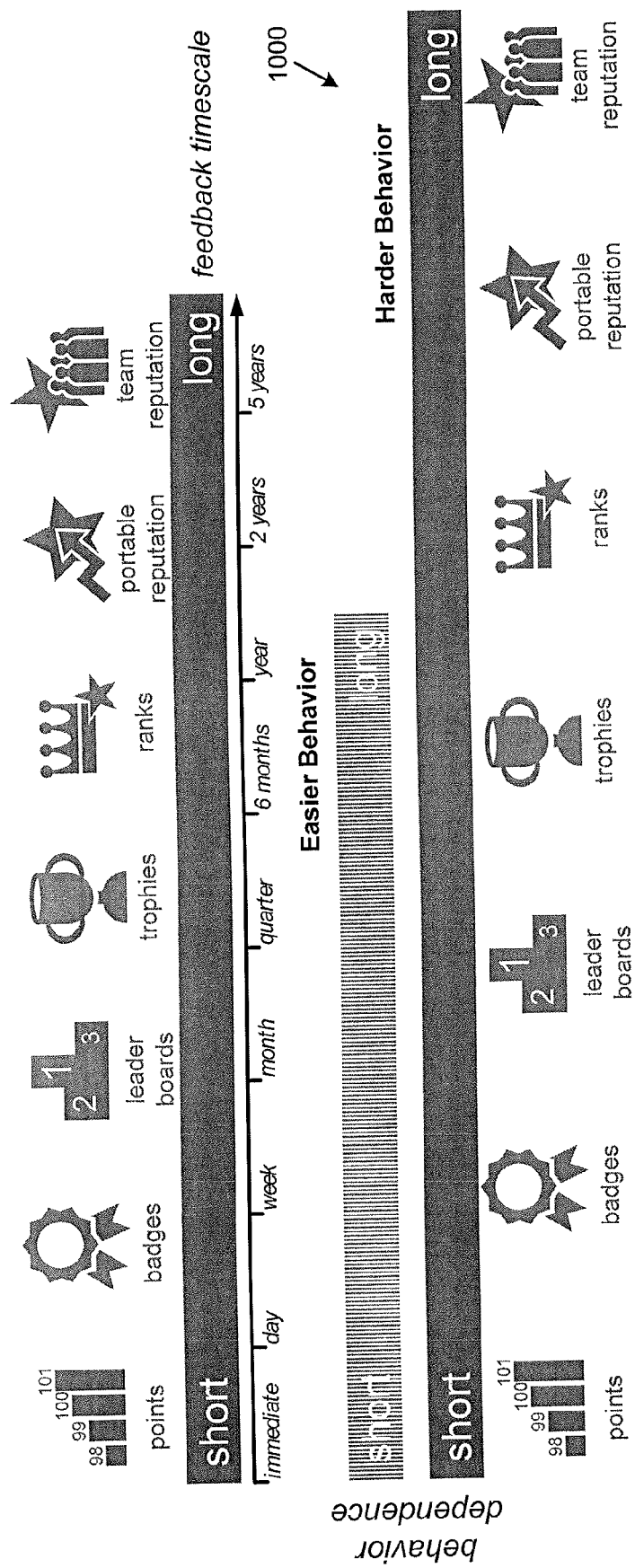

As illustrated in FIG. 9, the feedback timescale shortens (900) when the gamified behavior is easier. Conversely, FIG. 10 illustrates that the feedback timescale lengthens (1000) for more difficult behavior.

Figure 11:
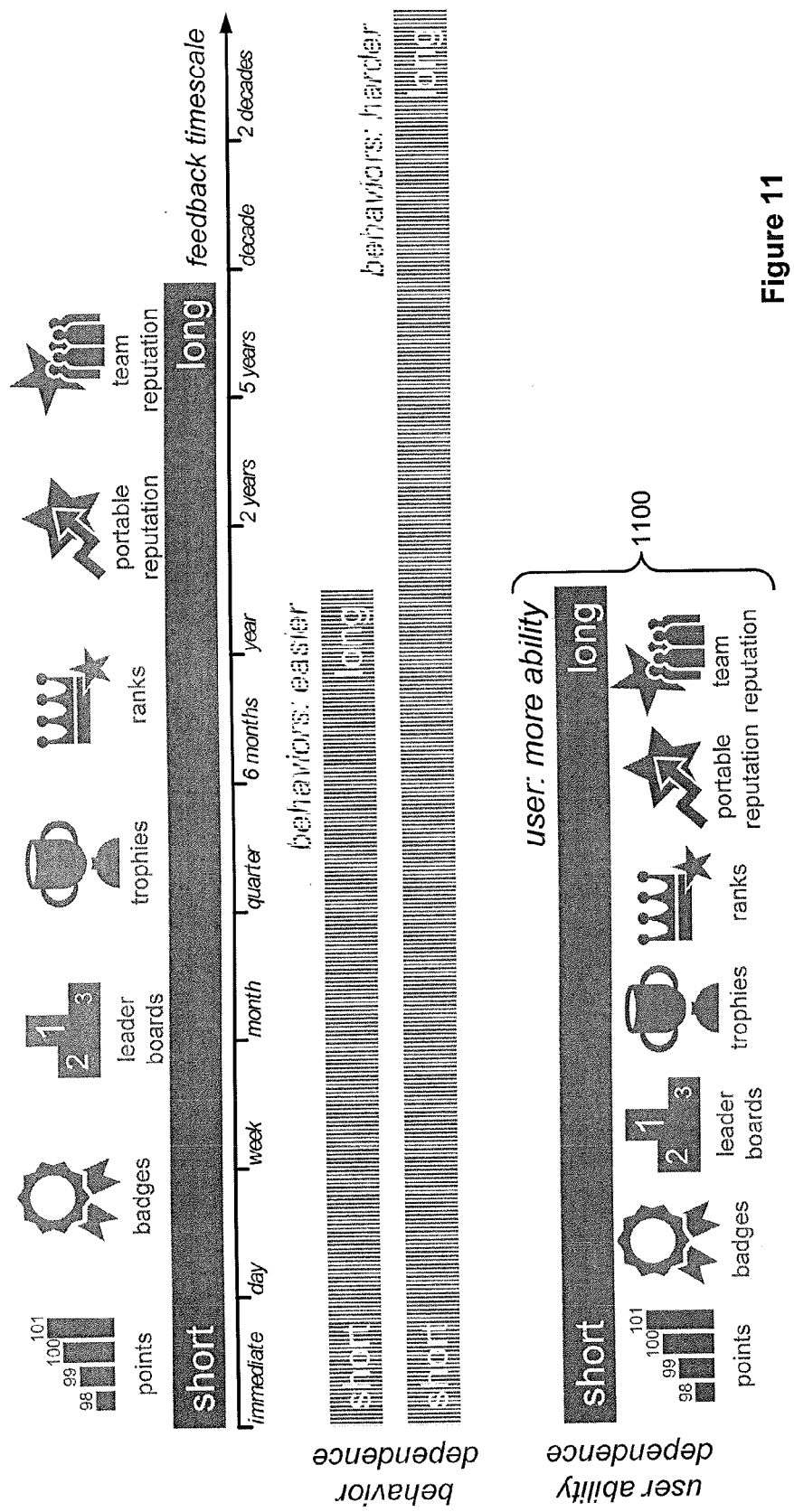
Figure 12:
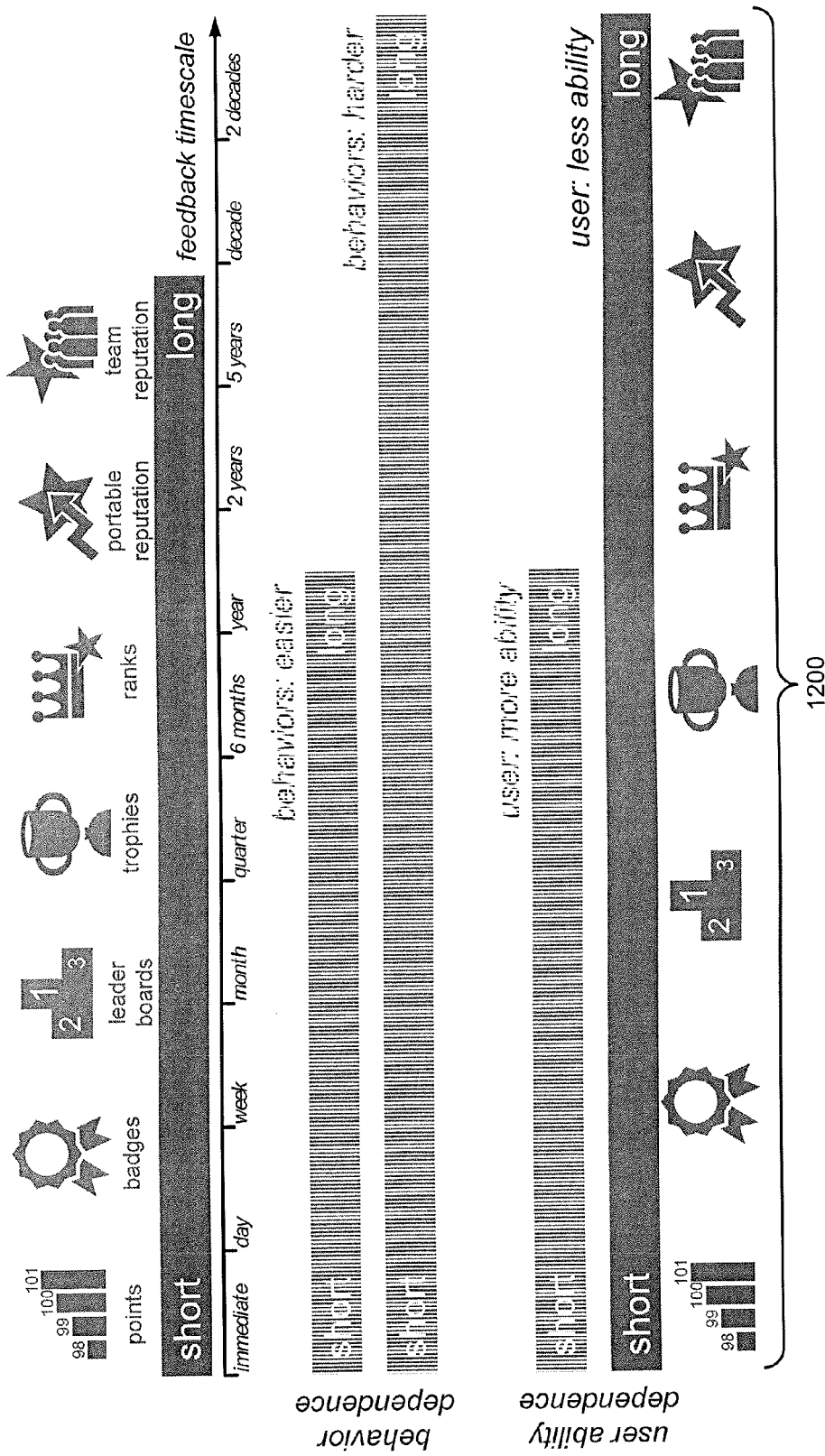

FIGS. 11 and 12 illustrate that the feedback timescale for the gamification tools also depends on the ability of each user. For example, for a user with more ability (e.g., a person with a lot of knowledge about a certain subject matter area), the entire timescale shortens (1100). Similarly, for a person with less ability (e.g., a novice in the subject matter area), the whole feedback timescale lengths (1200), as illustrated in FIG. 12.

FIG. 9-12 illustrate that the same gamification tools have different timescales depending on the difficult of the gamified behavior (shortening or lengthening the timescale for all users) as well as the skill/ability/knowledge of each individual user.

Figure 13:
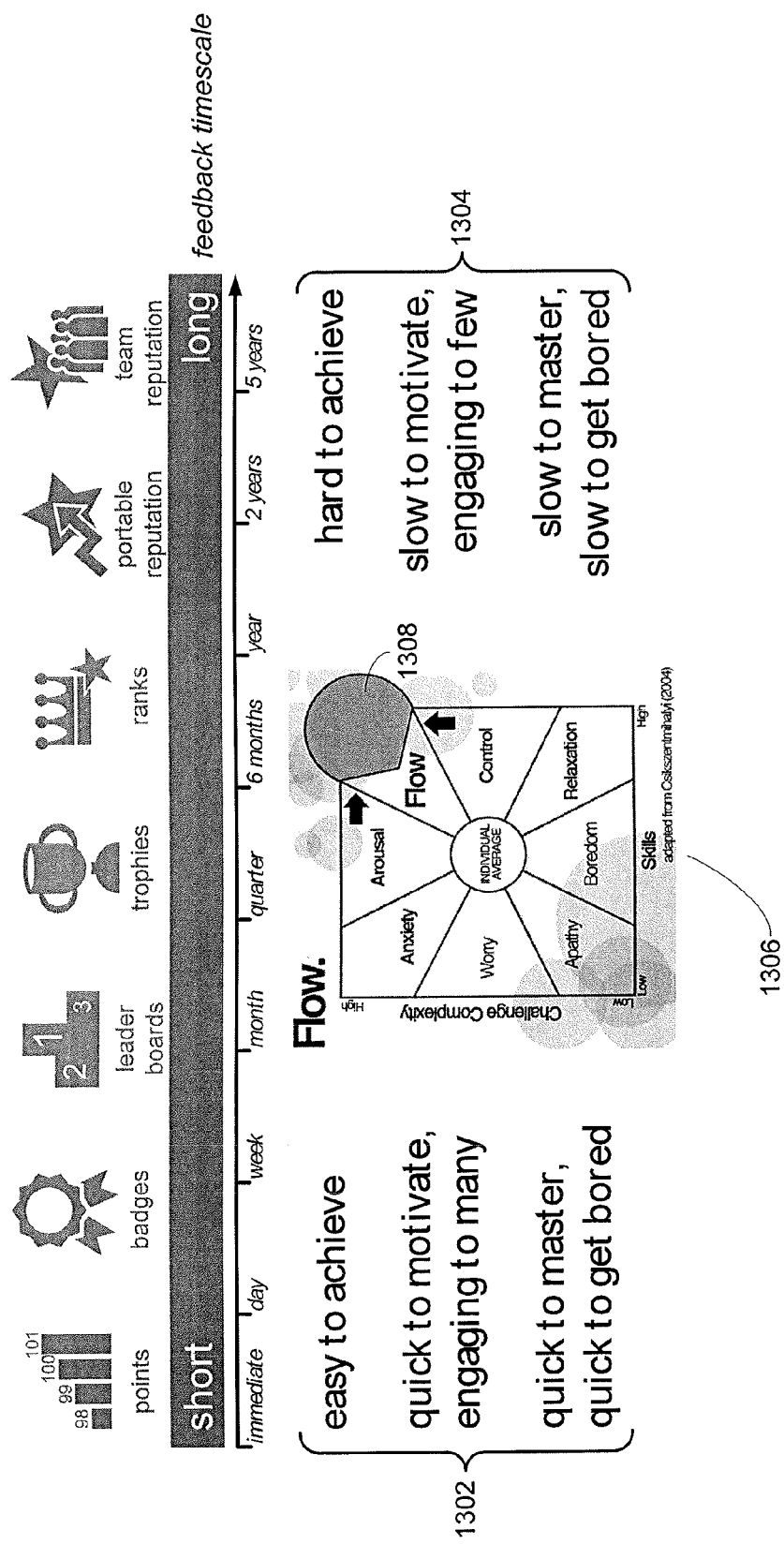
FIG. 13 illustrates characteristics of both ends of the feedback spectrum, and illustrates the various psychological states that are created based on the combination of user skill and behavior complexity, in accordance with some implementations.

FIG. 13 illustrates characteristics of the gamification tools at the left end 1302 of the spectrum as well as characteristics of the gamification tools at the right end 1304 of the spectrum. Intermediate tools have characteristics that are between the two ends. The diagram 1306 illustrates how the combination of user skill and complexity of gamified behavior lead to various psychological states. For each gamified task, when the user's skill level is appropriately high and the challenge is appropriately high, the user is in a state of "flow" 1308 where the user is fully engaged and immersed with the activity.

Figure 14:
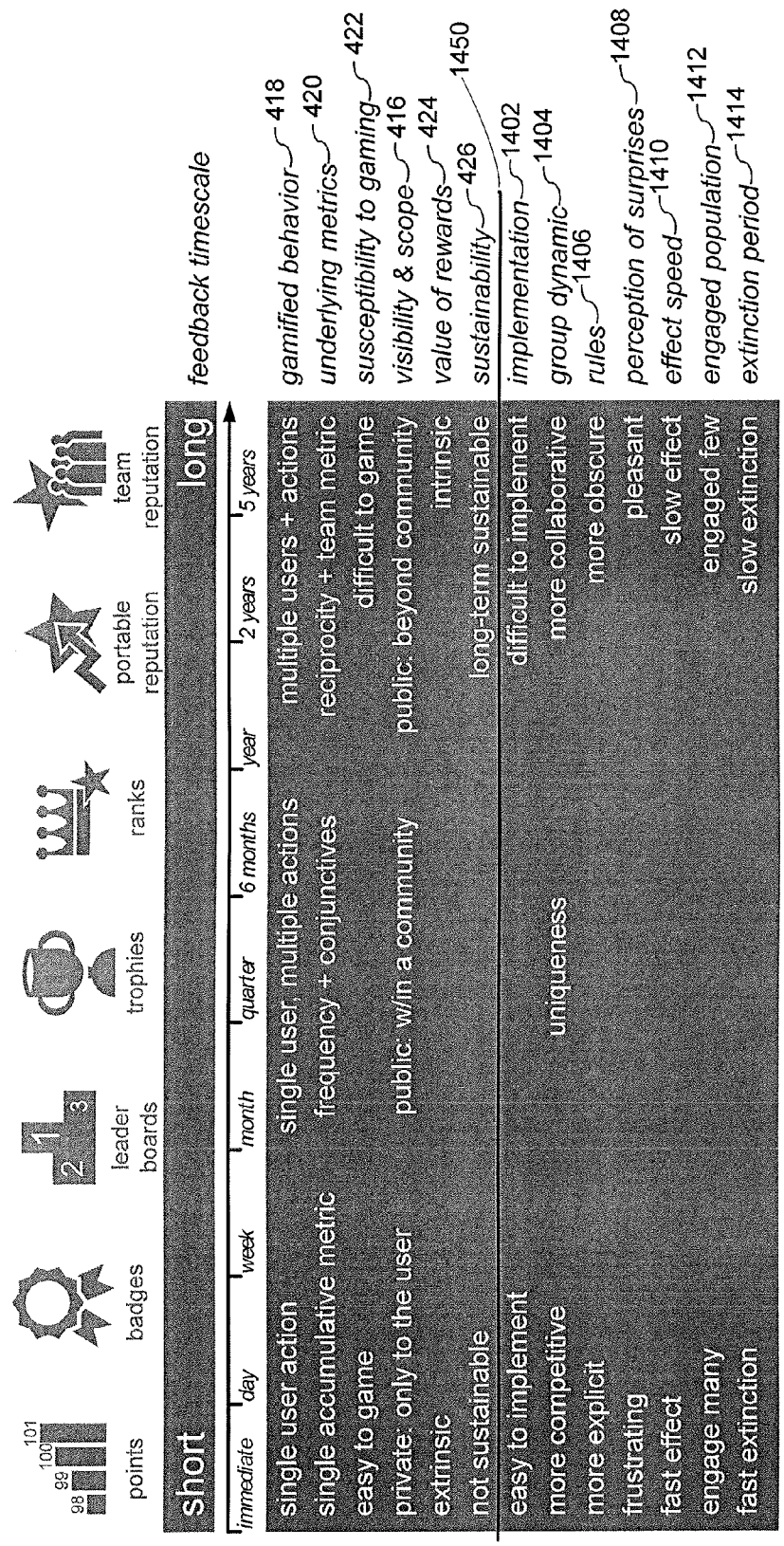
FIG. 14 extends FIG. 4 and illustrates various characteristics of the feedback spectrum in accordance with some implementations.

FIG. 14 expands on the feedback spectrum description provided above in FIG. 4. The characteristics 416-426 above the line 1450 are illustrated and described above with respect to FIG. 4. For example, gamification tools with a short time scale have a greater susceptibility to gaming (422), such as making trivial postings to an online forum to gain points compared to earning a reputation based on well thought out useful answers to other people's questions.

As indicated by the implementation characteristic 1402, shorter time scale gamification features are easier to implement. It is very simple to track the number of posts to a message board, give badges based on the number of posts, or to track who has the most posts. However, ranking individuals based on the quality of the posts, or establishing a meaningful reputation are more difficult. Because of this, it is common for people implementing online communities to focus on the easier gamification features.

In general, the gamification features with a short time scale have a group dynamic 1404 that is focused on competition against others. A user succeeds at the gamified behavior by beating others in terms of points or badges, or getting onto the leader board. On the other hand, people have different unique skills, and many of the biggest challenges require collaborative efforts. The gamified features with a longer time scale thus focus more on collaborative work, where people are working together to help each other and to solve problems that might not be achievable by a single individual.

One way to encourage cooperation is to have many different community metrics, which measure different types of involvement or skill. Because people have different unique skills, there is an incentive to collaborate with other who have different skills.

Rules 1406 for gamified behavior can be explicit, which is generally good for tools with a short time scale to avoid confusion. For example, the users know that if they post to a forum, they will receive points. If the rules were unclear, some users would not get engaged. However, for gamification tools with a longer time frame, less clear rules may be fine or even advantageous. It generally takes creativity and a long term commitment to gain a rank or to build a reputation, and the users don't really need a set of explicit rules to motivate them. This implicitness also adds mystery and challenges to the achievement of certain rank and reputation.

The perception (1408) of surprises is similar to rules 1406, and depends on the nature of the gamified behavior. For example, a user use is expected to get points for making online posts might be frustrated or annoyed if the gamification tool did not perform as expected. On the other hand, surprises may be good for a person building a rank or reputation because it can add more excitement to the challenge.

As noted above, the effect speed 1410 for short timescale gamification tools is very fast, whereas long time scale gamification tools have effects that occur very slowly.

As indicated above, gamification tools are not inherently good or bad. They have different characteristics that place them at different points along a continuum, and the combination of all them contributes to building a lively online community. For example, the engaged population 1412 of users is very large for gamification tools with a short time scale, which is very useful for bringing new users to a community. On the other hand, the gamification tools with a short time scale also have an extinction period 1414 that is very fast. It is important to move on to gamification tools with longer time scales. Conversely, only a small number of people ultimately reach the highest levels of the feedback spectrum, but those that reach that level stay involved for a long time.

FIG. 14 illustrates how the gamification tools are used sequentially to form a ladder 1502. In the graph of user skill versus challenge difficulty, there is a very large frustration region 1524 at the top, where the difficulty is too great for a user's ability and a very large boredom region 1522 at the bottom, where the difficulty is too low for a user's ability. Through the middle is a narrow flow band 1520, and the goal is to adjust the challenge level according to a user's changing ability level using successive rungs on the gamification ladder. The flow line 1518 for an individual user moves to the right as the user's ability level increases, but before the flow line 1518 moves into the boredom region 1522, a new gamification tool is introduced, creating a vertical portion of the flow line. By introducing the appropriate gamification tool, the user remains in the flow band 1520 instead to going into the frustration region 1524. The flow line 1518 thus stays within the flow band 1520 by applying successive gamification tools as the user's skill or ability increases.

As indicated in the graph, a user is initially a consumer 1504 of information. Over time, the user shares (1506) useful information with others. Progressing further along the flow path, the user may curate (1508) a portion of the online community, and may eventually be asked to create (1510) content (e.g., a knowledge base article). Some user's even go on to co-create (1512) content with other authors, who are commonly employees of the business entity.

Based on empirical research of online communities, communities that apply the gamification techniques in this way are far more likely to be successful.

Figure 15:
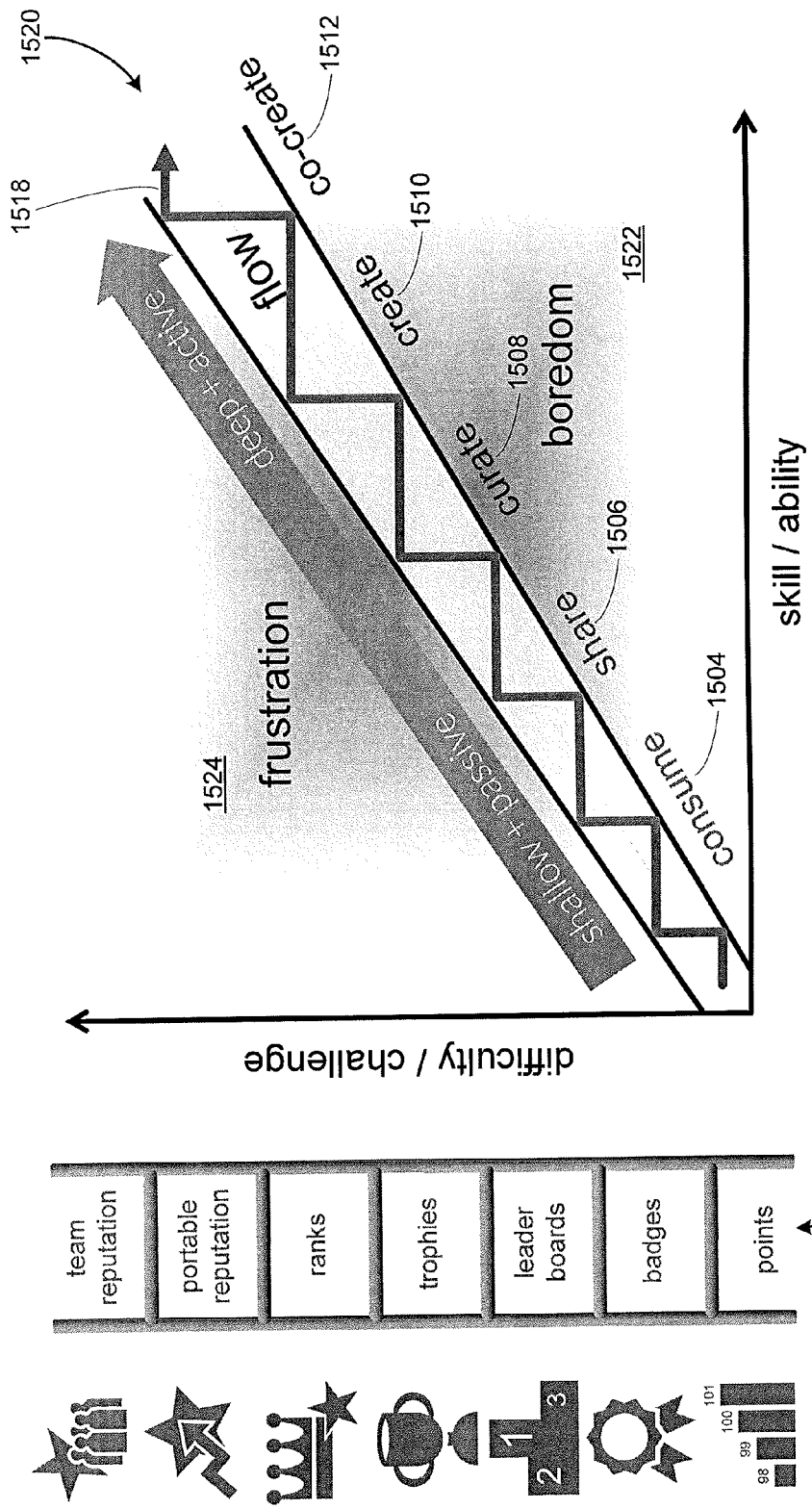
FIG. 15 illustrates how the tools in the feedback spectrum can be used appropriately to keep users in the "flow" band between boredom and frustration in accordance with some implementations.
Figure 16:
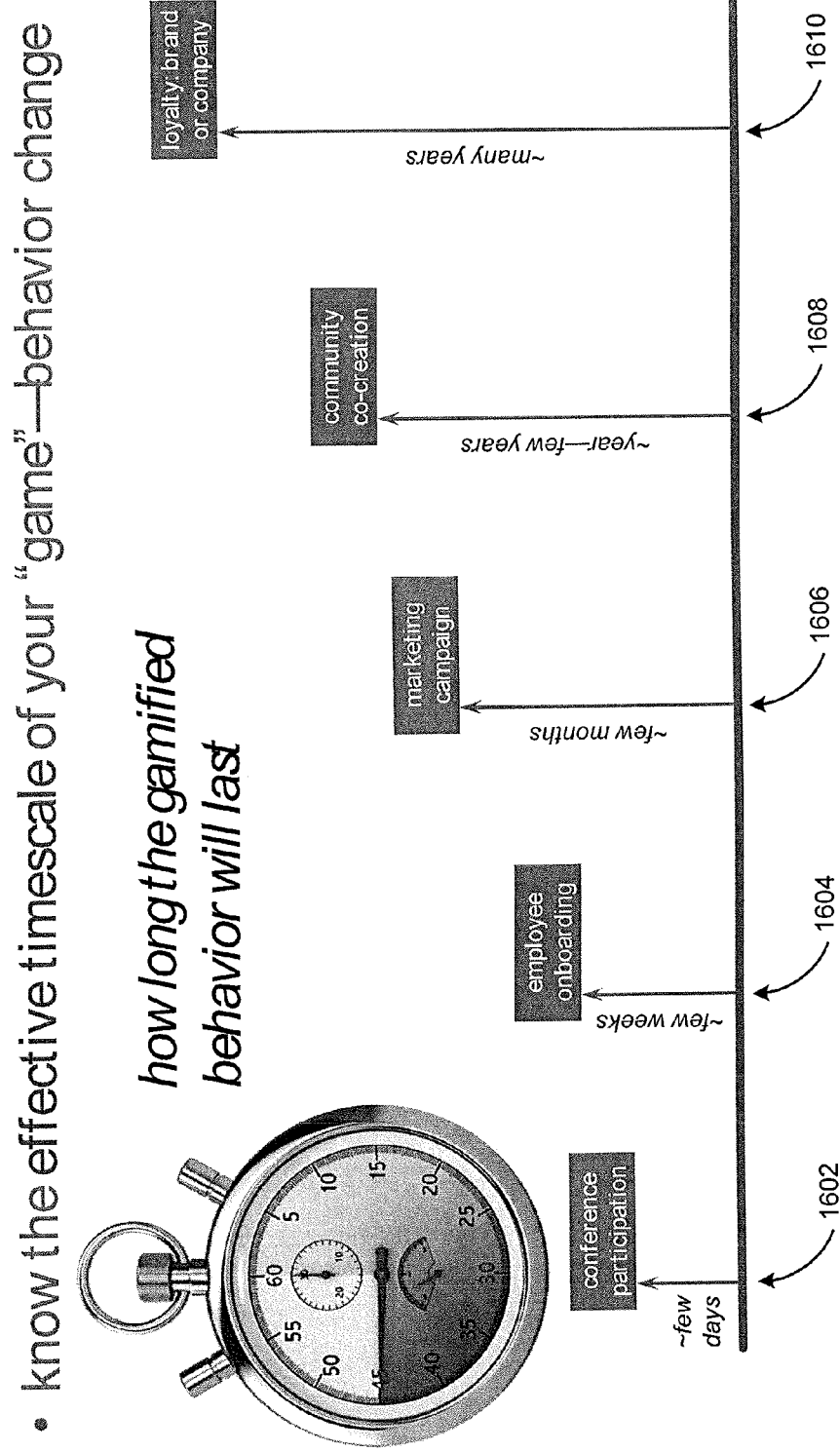
FIGS. 16-18 illustrate using the feedback spectrum to grow involvement with an online community in accordance with some implementations.
Figure 17:
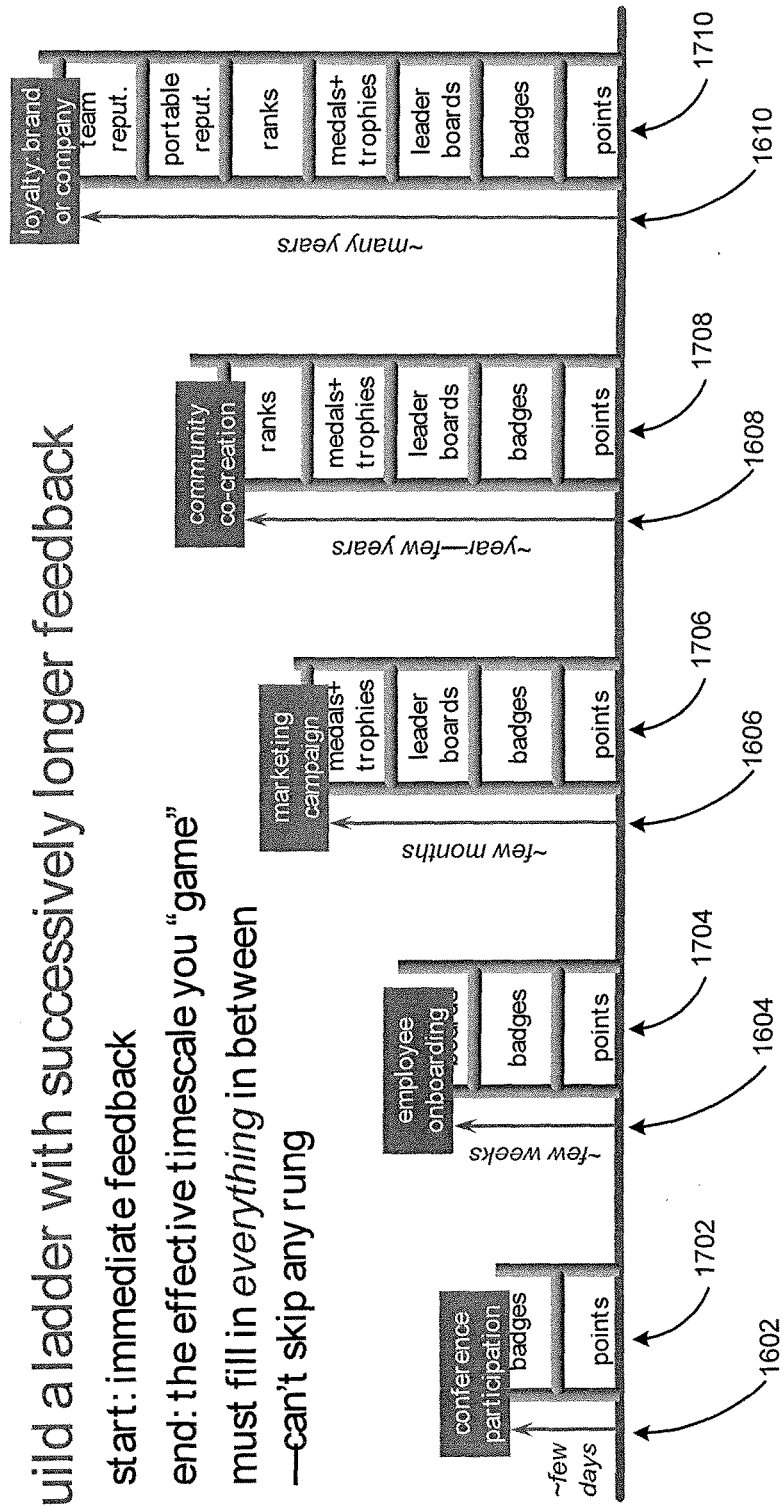

FIGS. 16 and 17 indicate that building the gamification tools for a specific online community require an understanding of the timescales. For example, user participation in a conference (1602) last only a few days, onboarding an employee (1604) may take a couple of weeks, rolling out a marketing campaign (1606) may take a few months, creating a community (1608) can take a year or more, and building loyalty (1610) to a brand or company can take many years. For each of these behaviors, an appropriate ladder 1702-1710 of gamification tools is used. The bottom rung includes simple gamification with immediate feedback, and the top rung is based on the length of the gamified behavior. Then, rungs of gamification tools are inserted between the bottom and the top to build a continuous spectrum, as illustrated in FIG. 15.

Figure 18:
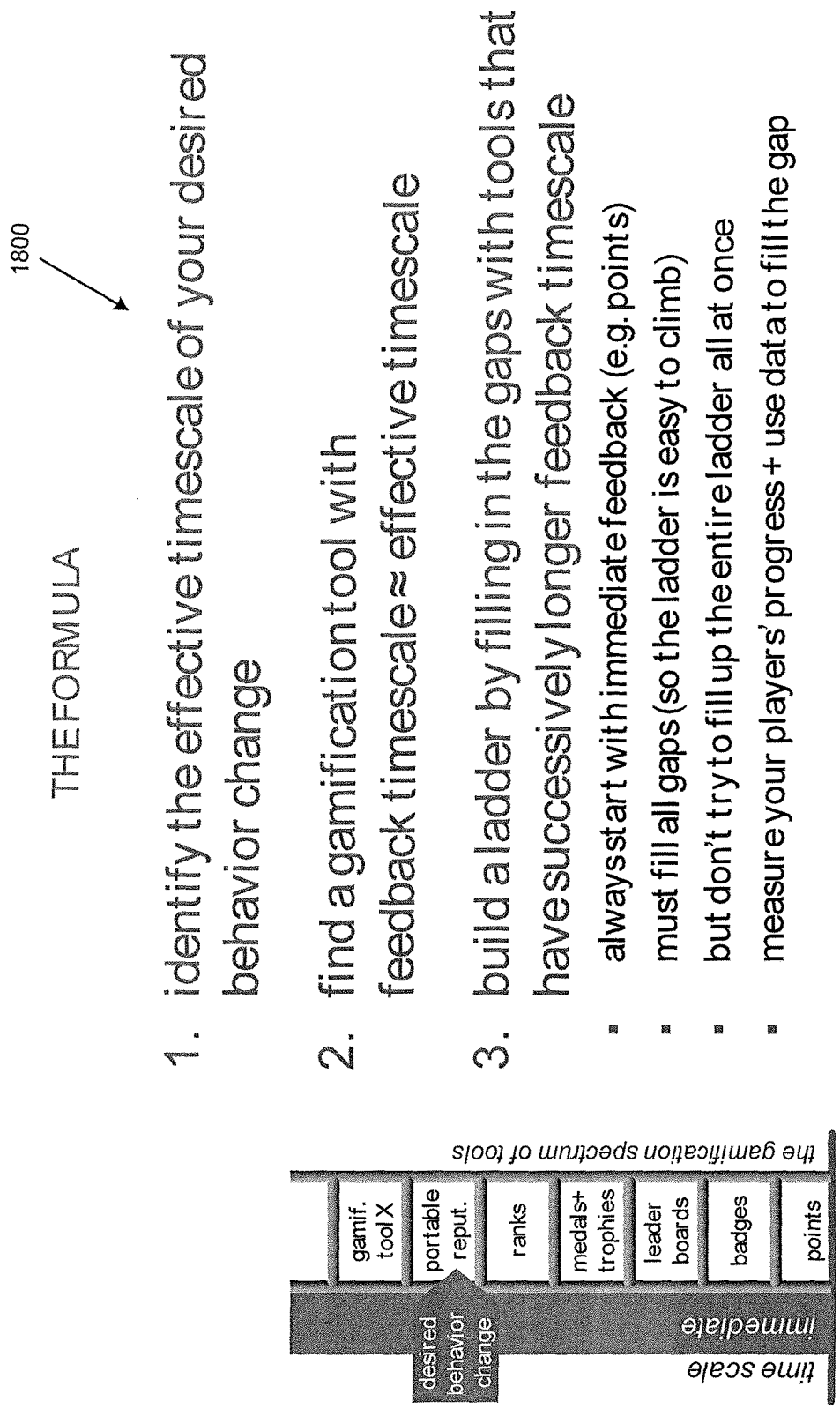

FIG. 18 outlines (1800) the steps in building a gamification tool ladder, such as the ladders 1702-1710 shown in FIG. 17. The first step is to identify the effective time scale. Based on this, a gamification tool is selected that corresponds to the effective time scale. Finally, the ladder is filled in with other gamification tools, starting at the lowest rung and then tools with successively longer time scales.

In addition to the gamification tools already identified, some implementations enable community managers to create "missions." A mission can use any of the existing gamification tools, but with an added resource constraint, which is typically time. A common use of missions is to fill in a gap that is discovered in the gamification ladder. Some examples of missions are provided below in FIG. 20. Missions are typically directed to specific sub-populations (e.g., the users who are stuck at a certain point in the feedback spectrum).

Figure 19:
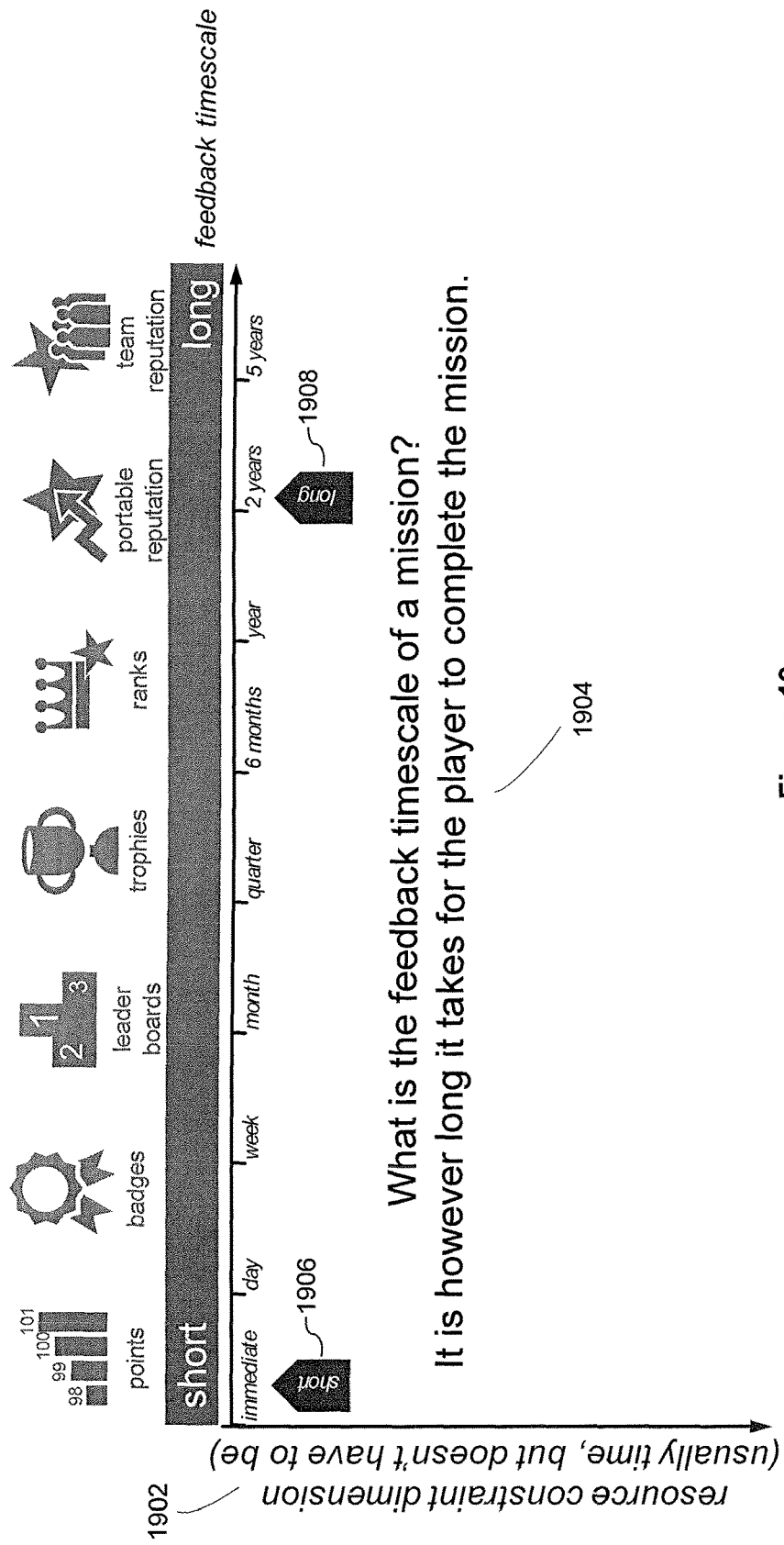

As indicated in FIG. 19, a mission has a resource constraint dimension 1902, which is typically time. That is, a user is asked to complete a specific task within a specified amount of time (or other limited resource). A mission can have (1904) any time scale, and is based on the amount of time that is allocated to complete the mission. For example, a mission can have a short time scale 1906 (e.g., a few hours) or a long time scale 1908 (e.g., a couple of years). The limited constraint for a mission may be a resource other than time, such as a limited number of kudos that a person can give out.

Figure 20:
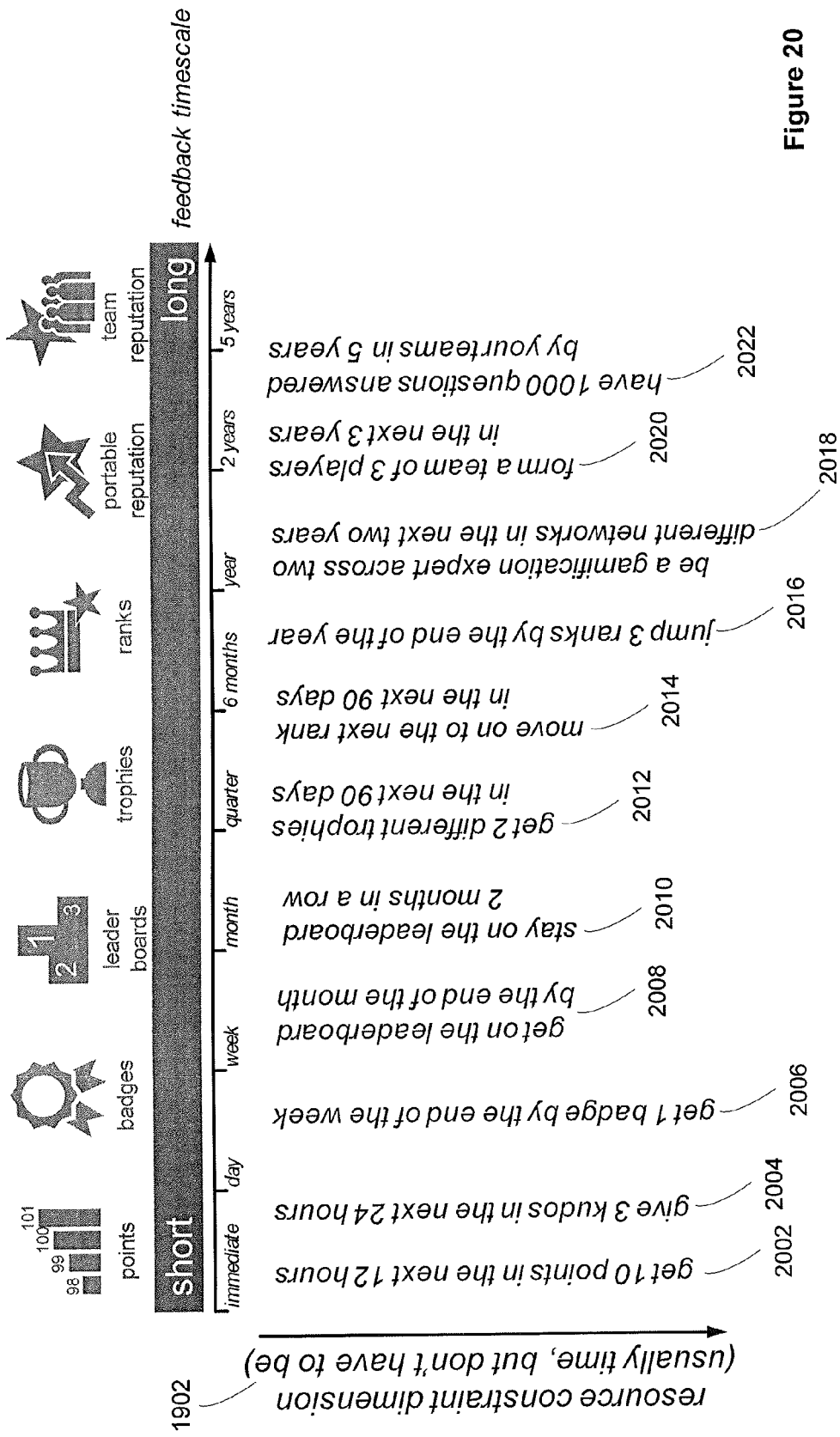
Figure 21:
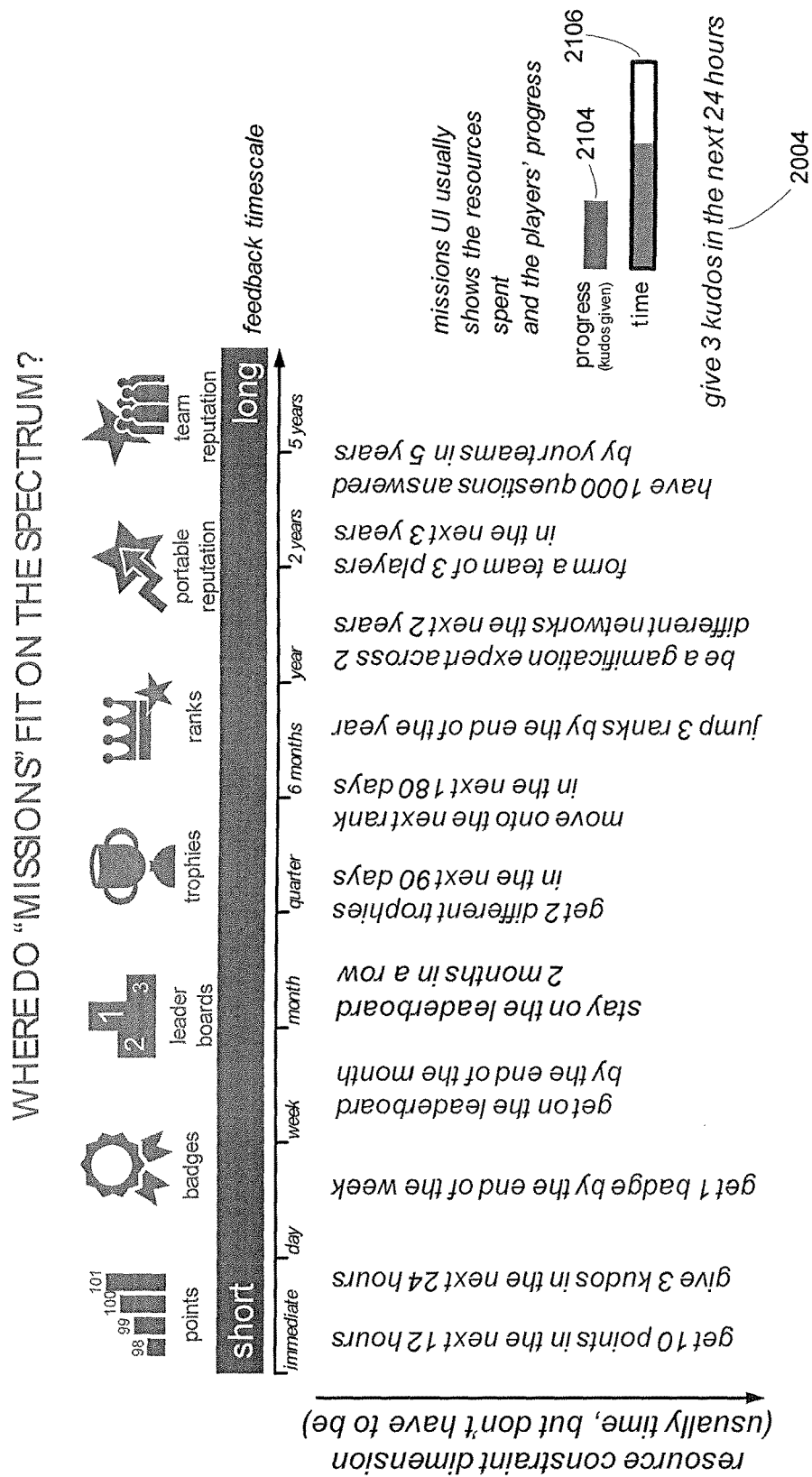

FIG. 20 illustrates several missions at various time scales. For example, a user may be asked to get (2002) 10 points in the next 12 hours or to give (2004) 3 kudos in the next 24 hours. On a slightly longer scale, the user may be asked to get (2006) one badge by the end of the week or to get (2008) on the leaderboard by the end of the month. On an even longer time scale, the user may be asked to stay (2010) on the leaderboard two months in a row or to get (2012) two different trophies in the next 90 days. In the medium time scale, the user may be asked to move (2014) on to the next rank in the next 90 days or to jump (2016) three ranks by the end of the year. In the much longer range, a user may be asked to be (2018) a gamification expert across two different networks in the next two years, form (2020) a team of three players in the next three years, or answer (2022) 1000 questions by the user's team over the next five years.

Typically, the user interface for a mission shows how much of the limited resource has already been used (2106) as well as the user's progress 2104 toward the objective of the mission. In this example, the mission is to give (2004) 3 kudos in the next 24 hours.

FIG. 22 provides some guidelines 2200 of when to use missions. In general, missions are appropriate when a substantial population of users are stuck or become stagnant, preventing them from moving to the next rung on the gamification ladder.

For example, suppose the earning a badge requires 50 points, but many people are stuck around 30 points. A useful mission could be to get 10 points by the end of the week. This mission could also be repeated two or three times if necessary.

As another example, suppose a "producer medal" requires text posts, posts of still images, and a video. If users are just posting text and still images, then a mission to share a funny video by the end of the week could be useful.

Keeping in mind that missions are based on many people being stuck, missions can be implemented that help the group as a whole. For example, suppose that reaching the rank of a trusted member requires membership in the community for a year, posting 100 messages, and receiving 10 kudos from other users. If there are not enough kudos to users to reach this rank, a community manager could create a mission to have users give three kudos to their favorite posts in the next 24 hours. This is also an example where the mission timescale (very short) is different from the timescale of the original gamification tool (a year).

Figure 23:
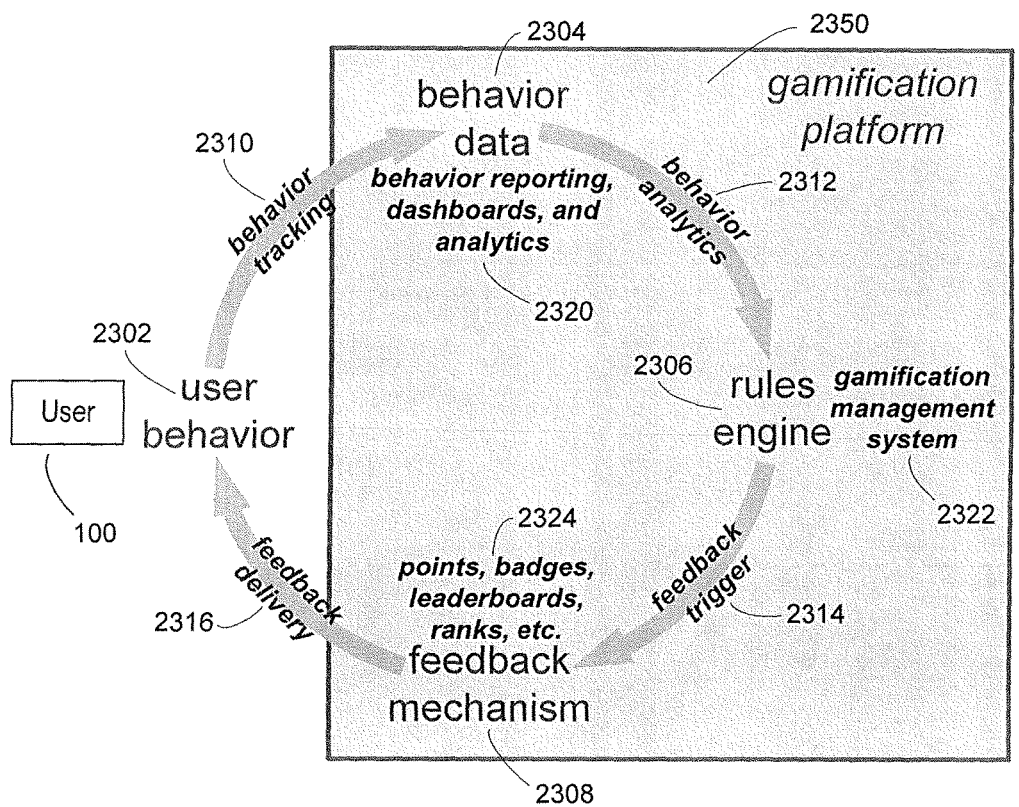
FIG. 23 illustrates the components of a gamification system in accordance with some implementations.

FIG. 23 illustrates the components of some gamification systems. The gamification platform 2350 interacts with a user 100 through a feedback loop. Part of the feedback loop includes actions/behavior 2302 of the user, and the gamification platform 2350 tracks (2310) the behavior. The tracked behavior data 2304 is stored by the gamification platform (e.g., in a database). The gamification platform 2350 can then provide (2320) reports, dashboards, or other analytics about the behavior data (e.g., how many people are visiting an online community or how has the activity of the community changed from the prior week). Computing behavior analytics 2312 is particularly useful, because actions can be taken when community interaction does not meet target goals. In some implementations, the gamification platform 2350 includes a gamification management system 2322, which uses a rules engine 2306 to trigger (2314) various forms of feedback to the user 100. As illustrated above, gamification system use a wide variety of feedback mechanisms 2308, including points, badges, leaderboards, and ranks 2324. The gamification platform 2350 includes various ways to deliver (2316) feedback to the user 100 to encourage ongoing participation. Feedback can be provided on a user interface for the online community (e.g., a leaderboard) or other external means (e.g., email or text messages to the user).

In general, a gamification platform is configurable to that a community manager can develop a set of appropriate feedback tools with different time scales, as discussed above. In some instances, adjustments are made to the feedback tools, which may include the use of missions.

Gamification relies heavily on the tracking of player actions/behaviors through metrics and behavior data. The behavior becomes more complex moving from the left to right along the spectrum, so the metrics and data that reflect these behaviors also become more sophisticated. Towards the left, the metrics that underlie the short feedback timescale tools are usually simple counters that accumulate over time as the player carries out the desired action. Moving to the right, tools like leaderboards use time-bounded frequency metrics. Since medals and trophies start to reward players for multiple actions, these tools use multiple metrics and various combinations of those metrics (e.g., conjunction).

In fact, tools on the right half of the spectrum can use conjunctions of metrics from any tools with shorter feedback timescales. For example, a user may get a community trail blazer trophy when the user is on the community contribution leaderboard for 5 weeks in a row. In this case, the trophy is using a conjunction of metrics from the leaderboard (a tool with shorter feedback timescale). Finally, tools on the far right of the spectrum leverage reciprocity metrics and team metrics that are even more complex, because reciprocity and collaborative behavior involves the behaviors of many users.

Ideal Visibility and Scope of Feedback

Although gamified applications often show off badges collected by their players, the tools with short feedback timescales (e.g., points and badges) are not ideal for public display. Since tools on the far left of the spectrum use metrics that are cumulative, they tend to be biased in favor of those who have been playing for a longer time. tools like points and badges are not really a fair comparison among the players. Making these tools publicly visible may actually demotivate the new players. Instead, tools with short feedback timescale are typically more suitable as feedback just to the individual user.

However, moving to the right of the spectrum, the metrics become less biased and less susceptible to gaming. For example the use of time-bound metrics in leaderboards eliminates the bias that favors early players. Consequently, feedback and rewards from tools in this part of the spectrum are a more fair and accurate reflection of the player's true ability. As such, they are more appropriate for public display within the community of players. On the far right of the spectrum, the achievements awarded from those tools are even suitable for display beyond the community of players.

In summary, points and badges are biased in favor of long-time players, so they are not really a fair comparison of people's skills or abilities. Points and badges are primarily a feedback to the players themselves, which are not blatantly visible to the public. Showing off people's points and badges publically may actually demotivate the majority of the population.

Value of Rewards

Examining the rewards/feedback of gamification tools, there is a pattern while moving across the spectrum. Because tools on the left of the spectrum only provide feedback to the players on their own performance data, the rewards from these tools are purely extrinsic. Moreover, because the gamified behavior is so simple (one action from the player), there is little uncertainty or mystery in the reward because the rewards are either completely transparent or easily predicted.

Moving to the right, the rewards become less predictable, because a reward is triggered only when all of the gamified actions are above a certain threshold. No reward is given even if any of the gamified actions does not meet the criterion, even if all the other factors are well above their respective thresholds. This makes the precise reward criteria harder to predict, and adds more mystery and uncertainty to the game. Such mystery not only creates entertainment value, it also serves as an anticipatory motivator for the players.

Tools on the far right of the spectrum reward players based on the actions of other players, such as reciprocal or collaborative actions. This social element makes rewards from tools on the far right of the spectrum more meaningful and valuable to the players. Hence, rewards from these tools are more intrinsically motivating.

In summary, the rewards offered by points and badges are purely extrinsic. It simply tells the players what they've done transparently. Trying to add mysteries in these simple gamification tools may actually confuse new players early on. Mystery should be used later with tools in the middle and right side of the spectrum, where the rewards are more intrinsic.

Sustainability

Naturally, tools on the left of the gamification spectrum are not sustainable, because the rewards they provide are purely extrinsic and have little long-term value to the players. Eventually the players will realize this fact and get bored quickly. On the other hand, tools on the right of the spectrum are sustainable, because the rewards they offer are intrinsic, more meaningful, and have greater value to the players. Points, badges and leaderboards are great starter tools for implementing gamification. They work well in the short-term, and drive results quickly, but it's not sustainable long term. To gamify a behavior for the long-term (e.g., years) gamification tools on the right of the spectrum are needed.

Implementation

From an implementation and deployment perspective, tools on the left side of the spectrum tend to be much easier to build, implement, and deploy. That is precisely why so many tools on the market are basically variants of points, badges, and leaderboards. On the other end of the spectrum, the tools are harder to implement. Not only do these tools need to track more complex behaviors, they also need to capture different types of behaviors and perform sophisticated analytics to understand those behaviors. As a result, many tools on the right end of the spectrums are custom built. They also require a substantial amount of time and effort to tune and configure, so they are generally not turn-key solutions out-of-the-box.

In summary, points, badges and leaderboards are easy to build. Companies having engineering resources can build their own system for tracking points, awarding badges, and showing off people on the leaderboard. These simple tools are also readily available from vendors. However, more sophisticated gamification tools on the right of the spectrum must be designed specifically for individual use cases and audiences in order to be effective. Because of this, they are rarely available out-of-the-box.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer server system hosting an online community for a business entity, comprising:
one or more servers, each including one or more processors, memory, and one or more programs stored in the memory, the one or more programs including a plurality of feedback interfaces, a participation measurement module, a notification module, a mission creation interface, and a mission feedback interface, wherein:
each of the feedback interfaces is configured to provide respective visual feedback in a user interface for the online community, the respective visual feedback quantifying, by tracking and storing in a database at the one or more servers, each user's interaction with the online community according to one or more respective metrics that measure user engagement with the online community, wherein each of the feedback interfaces has a distinct respective interaction time scale, including a first feedback interface whose time scale is immediate, a second feedback interface whose time scale is one year or more, and one or more intermediate feedback interfaces whose time scales are intermediate between the first and second feedback interfaces;
the participation measurement module provides the metrics that measure engagement with the online community, correlates reduction in technical support costs for the business entity in relation to engagement with the online community, and alerts a community manager when a substantial subpopulation of users are not performing all behaviors associated with an identified one of the feedback interfaces;
the mission creation interface receives input, from the community manager, to create a targeted mission for the subpopulation of users, wherein the targeted mission specifies an action for users in the subpopulation to perform and specifies a time limit, and wherein completion of the action by users in the subpopulation increases completion of the behaviors associated with the identified one of the feedback interfaces;
the notification module is configured to send messages to users in the subpopulation to alert them of the targeted mission; and
the mission feedback interface is configured to provide mission feedback visually in the user interface for the online community for users in the subpopulation, wherein the mission feedback includes displaying, by the mission feedback interface, a dynamic indicator of how much time each user has remaining to complete the action and displaying, by the mission feedback interface, a dynamic indicator of what portion of the action the user has already completed, wherein the dynamic indicator of what portion of the action the user has already completed is automatically updated based on receiving, by the identified one of the feedback interfaces, an indication of an increase in completion, by the user, of the behaviors associated with the identified one of the feedback interfaces.

2. The computer server system of claim 1, wherein the first feedback interface displays feedback for a metric that measures consumption of community content by each user.

3. The computer server system of claim 1, wherein a feedback interface of the plurality of feedback interfaces displays feedback for a metric that measures sharing of community content by each user within each user's social network.

4. The computer server system of claim 1, wherein a feedback interface of the plurality of feedback interfaces displays feedback for a metric that measures curation of community content by each user.

5. The computer server system of claim 1, wherein a feedback interface of the plurality of feedback interfaces displays feedback for a metric that measures creation of community content by each user.

6. The computer server system of claim 1, wherein a feedback interface of the plurality of feedback interfaces provides feedback in the form of a leader board.

7. The computer server system of claim 5, wherein information on the leader board is filtered so that the user interface displays information for each respective user based on a group of other users sharing a set of behavior characteristics with the respective user.

8. The computer server system of claim 1, wherein the notification module is configured to send electronic messages as electronic mail or SMS text messages.

9. The computer server system of claim 1, wherein the feedback interfaces include a reputation module configured to communicate achievement badges with online social media other than the online community and verify the authenticity of those badges, thereby making a user's reputation within the online community portable to the other online social media.

10. A non-transitory computer readable storage medium storing one or more programs configured for execution by a computer server system, the one or more programs including a plurality of feedback interfaces, a participation measurement module, a notification module, a mission creation interface, and a mission feedback interface, wherein:
   each of the feedback interfaces is configured to provide respective visual feedback in a user interface for the online community, the respective visual feedback quantifying, by tracking and storing in a database at the computer server system, each user's interaction with the online community according to one or more respective metrics that measure user engagement with the online community, wherein each of the feedback interfaces has a distinct respective interaction time scale, including a first feedback interface whose time scale is immediate, a second feedback interface whose time scale is one year or more, and one or more intermediate feedback interfaces whose time scales are intermediate between the first and second feedback interfaces;
   the participation measurement module provides the metrics that measure engagement with the online community, correlates reduction in technical support costs for the business entity in relation to engagement with the online community, and alerts a community manager when a substantial subpopulation of users are not performing all behaviors associated with an identified one of the feedback interfaces;
   the mission creation interface receives input, from the community manager to create a targeted mission for the subpopulation of users, wherein the targeted mission specifies an action for users in the subpopulation to perform and specifies a time limit, and wherein completion of the action by users in the subpopulation increases completion of the behavior associated with the identified one of the feedback interfaces;
   the notification module is configured to send messages to users in the subpopulation to alert them of the targeted mission; and
   the mission feedback interface is configured to provide mission feedback visually in the user interface for the online community for users in the subpopulation, wherein the mission feedback includes displaying, by the mission feedback interface, a dynamic indicator of how much time each user has remaining to complete the action and displaying, by the mission feedback interface, a dynamic indicator of what portion of the action the user has already completed, wherein the dynamic indicator of what portion of the action the user has already completed is automatically updated based on receiving, by the identified one of the feedback interfaces, an indication of an increase in completion, by the user, of the behaviors associated with the identified one of the feedback interfaces.

11. The computer readable storage medium of claim 10, wherein the first feedback interface displays feedback for a metric that measures consumption of community content by each user.

12. The computer readable storage medium of claim 10, wherein a feedback interface of the plurality of feedback interfaces displays feedback for a metric that measures sharing of community content by each user within each user's social network.

13. The computer readable storage medium of claim 10, wherein a feedback interface of the plurality of feedback interfaces displays feedback for a metric that measures curation of community content by each user.

14. The computer readable storage medium of claim 10, wherein a feedback interface of the plurality of feedback interfaces displays feedback for a metric that measures creation of community content by each user.

15. The computer readable storage medium of claim 10, wherein a feedback interface of the plurality of feedback interfaces provides feedback in the form of a leader board.

16. The computer readable storage medium of claim 14, wherein information on the leader board is filtered so that the user interface displays information for each respective user based on a group of other users sharing a set of demographic characteristics with the respective user.

17. The computer readable storage medium of claim 10, wherein the feedback interfaces include a reputation module configured to communicate achievement badges with online social media other than the online community and verify the authenticity of those badges, thereby making a user's reputation within the online community portable to the other online social media.

18. A method of operating an online community for a business entity, comprising:
   at one or more servers hosting the online community, wherein each of the one or more servers includes one or more processors, memory, and one or more programs stored in the memory, the one or more programs including a plurality of feedback interfaces, a participation measurement module, a notification module, a mission creation interface, and a mission feedback interface:
      executing each of the feedback interfaces to provide respective visual feedback in a user interface for the online community, the respective visual feedback quantifying, by tracking and storing in a database at the one or more servers, each user's interaction with the online community according to one or more respective metrics that measure user engagement with the online community, wherein each of the feedback interfaces has a distinct respective interaction time scale, including a first feedback interface whose time scale is immediate, a second feedback interface whose time scale is one year or more, and one or more intermediate feedback interfaces whose time scales are intermediate between the first and second feedback interfaces;

executing the participation measurement module to provide the metrics that measure engagement with the online community, to correlate reduction in technical support costs for the business entity in relation to engagement with the online community, and to alert a community manager when a substantial subpopulation of users are not performing all behaviors associated with an identified one of the feedback interfaces;

executing the mission creation interface configured to receive input from the community manager to create a targeted mission for the subpopulation of users, wherein the targeted mission specifies an action for users in the subpopulation to perform and specifies a time limit, and wherein completion of the action by users in the subpopulation increases completion of the behavior associated with the identified one of the feedback interfaces;

executing the notification module to send messages to users in the subpopulation to alert them of the targeted mission; and executing the mission feedback interface to provide mission feedback visually in the user interface for the online community for users in the subpopulation, wherein the mission feedback includes displaying, by the mission feedback interface, a dynamic indicator of how much time each user has remaining to complete the action and displaying, by the mission feedback interface, a dynamic indicator of what portion of the action the user has already completed, wherein the dynamic indicator of what portion of the action the user has already completed is automatically updated based on receiving, by the identified one of the feedback interfaces, an indication of an increase in completion, by the user, of the behaviors associated with the identified one of the feedback interfaces.

19. The computer server system of claim 1, wherein the feedback interfaces include a reputation module configured to communicate achievement badges with online social media other than the online community and verify the authenticity of those badges, thereby making a user's reputation within the online community portable to the other online social media.

* * * * *